(12) United States Patent
Choi et al.

(10) Patent No.: US 10,432,947 B2
(45) Date of Patent: Oct. 1, 2019

(54) METHOD AND APPARATUS FOR DECODING VIDEO, AND METHOD AND APPARATUS FOR CODING VIDEO

(71) Applicant: SAMSUNG ELECTRONICS CO., LTD., Suwon-si (KR)

(72) Inventors: Na-rae Choi, Seoul (KR); Min-woo Park, Yongin-si (KR); Chan-yul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 15/771,006

(22) PCT Filed: Nov. 24, 2016

(86) PCT No.: PCT/KR2016/013649
§ 371 (c)(1),
(2) Date: Apr. 25, 2018

(87) PCT Pub. No.: WO2017/091016
PCT Pub. Date: Jun. 1, 2017

(65) Prior Publication Data
US 2018/0310001 A1    Oct. 25, 2018

Related U.S. Application Data

(60) Provisional application No. 62/259,170, filed on Nov. 24, 2015.

(51) Int. Cl.
*H04N 19/159* (2014.01)
*H04N 19/117* (2014.01)
(Continued)

(52) U.S. Cl.
CPC ......... *H04N 19/159* (2014.11); *H04N 19/117* (2014.11); *H04N 19/147* (2014.11);
(Continued)

(58) Field of Classification Search
CPC .. H04N 19/159; H04N 19/147; H04N 19/176; H04N 19/117; H04N 19/182
See application file for complete search history.

(56) References Cited

U.S. PATENT DOCUMENTS

| 9,578,329 B2 | 2/2017 | Yang et al. |
| 9,813,727 B2 | 11/2017 | Lee et al. |

(Continued)

FOREIGN PATENT DOCUMENTS

| JP | 2014-518031 A | 7/2014 |
| JP | 2014-225795 A | 12/2014 |

(Continued)

OTHER PUBLICATIONS

Search Report dated Mar. 27, 2017, issued by the International Searching Authority in counterpart Internal Patent Application No. PCT/KR2016/013649 (PCT/ISA/210).

(Continued)

*Primary Examiner* — Nam D Pham
(74) *Attorney, Agent, or Firm* — Sughrue Mion, PLLC

(57) ABSTRACT

Provided are a video decoding method and a video decoding apparatus capable of performing the video decoding method. The video decoding method includes: determining neighboring pixels of a current block to be used for performing intra prediction on the current block; acquiring, from a bitstream, information indicating one of a plurality of filtering methods used on the neighboring pixels; selecting one of the plurality of filtering methods according to the acquired information; filtering the neighboring pixels by using the selected filtering method; and performing the intra prediction on the current block by using the filtered neighboring pixels, wherein the plurality of filtering methods comprise a spatial domain filtering method and a frequency domain filtering method, wherein the spatial domain filtering method filters the neighboring pixels in a spatial domain, (Continued)

and the frequency domain filtering method filters the neighboring pixels in a frequency domain.

15 Claims, 23 Drawing Sheets

(51) Int. Cl.
*H04N 19/182* (2014.01)
*H04N 19/80* (2014.01)
*H04N 19/176* (2014.01)
*H04N 19/147* (2014.01)
*H04N 19/105* (2014.01)
*H04N 19/11* (2014.01)
*H04N 19/33* (2014.01)
*H04N 19/625* (2014.01)
*H04N 19/119* (2014.01)
*H04N 19/96* (2014.01)
*H04N 19/14* (2014.01)

(52) U.S. Cl.
CPC ......... *H04N 19/176* (2014.11); *H04N 19/182* (2014.11); *H04N 19/80* (2014.11); *H04N 19/105* (2014.11); *H04N 19/11* (2014.11); *H04N 19/119* (2014.11); *H04N 19/14* (2014.11); *H04N 19/33* (2014.11); *H04N 19/625* (2014.11); *H04N 19/96* (2014.11)

(56) References Cited

U.S. PATENT DOCUMENTS

| | | | |
|---|---|---|---|
| 9,930,366 | B2 | 3/2018 | Zheng et al. |
| 2011/0038415 | A1* | 2/2011 | Min .................. H04N 19/115 375/240.12 |
| 2015/0229965 | A1 | 8/2015 | Park et al. |
| 2015/0229967 | A1 | 8/2015 | Lee |

FOREIGN PATENT DOCUMENTS

| | | |
|---|---|---|
| KR | 10-2013-0119494 A | 10/2013 |
| KR | 10-2014-0034053 A | 3/2014 |
| KR | 10-2015-0059146 A | 5/2015 |
| KR | 10-1547497 B1 | 8/2015 |

OTHER PUBLICATIONS

Written Opinion dated Mar. 27, 2017, issued by the International Searching Authority in counterpart Internal Patent Application No. PCT/KR2016/013649 (PCT/ISA/237).

* cited by examiner

SPATIAL DOMAIN

FREQUENCY DOMAIN

FIG. 20

| BLOCK TYPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD AND APPARATUS FOR DECODING VIDEO, AND METHOD AND APPARATUS FOR CODING VIDEO

TECHNICAL FIELD

The present disclosure relates to video decoding methods and apparatuses and video encoding methods and apparatuses. Particularly, the present disclosure relates to methods of applying filtering to a reference sample used for intra prediction.

BACKGROUND ART

In accordance with the development and spread of hardware for reproducing and storing high-resolution or high-quality video content, the need for a video codec for effectively encoding or decoding high-resolution or high-quality video content is increasing. According to a conventional video codec, a reference sample used for intra prediction is filtered through a reference sample filtering process. However, a conventional filtering technique applies a simple-type filter to a reference region according to a block size or mode. This method fails to effectively remove noise from the reference region, thus degrading prediction efficiency. Particularly, in the case of High Efficiency Video Coding (HEVC), there is a reference filtering technique in a 32×32 block; however, this only somewhat reduces a blocking artifact existing in a transform block boundary existing in a reference region in a smooth region, but also fails to effectively remove noise from the reference region. A prediction error caused by a strong edge and noise in the reference region may cause a problem of degradation of transformation efficiency.

DESCRIPTION OF EMBODIMENTS

Technical Problem

Provided are video decoding/encoding methods and apparatuses that may improve intra prediction performance and intra coding efficiency through filtering of a reference sample used for intra prediction.

Solution to Problem

According to an aspect of the disclosure, there is provided a video decoding method including: determining neighboring pixels of a current block to be used for performing intra prediction on the current block; acquiring, from a bitstream, information indicating one of a plurality of filtering methods used on the neighboring pixels; selecting one of the plurality of filtering methods according to the acquired information; filtering the neighboring pixels by using the selected filtering method; and performing the intra prediction on the current block by using the filtered neighboring pixels, wherein the plurality of filtering methods include a spatial domain filtering method and a frequency domain filtering method, wherein the spatial domain filtering method filters the neighboring pixels in a spatial domain, and the frequency domain filtering method filters the neighboring pixels in a frequency domain.

According to another aspect of the present disclosure, there is provided a video encoding method including: determining neighboring pixels of a current block to be used for performing intra prediction on the current block; selecting one of a plurality of filtering methods used on the neighboring pixels; filtering the neighboring pixels by using the selected filtering method; and performing the intra prediction on the current block by using the filtered neighboring pixels, wherein the plurality of filtering methods include a spatial domain filtering method and a frequency domain filtering method, wherein the spatial domain filtering method filters the neighboring pixels in a spatial domain, and the frequency domain filtering method filters the neighboring pixels in a frequency domain.

According to another aspect of the present disclosure, there is provided a video decoding apparatus including: a neighboring pixel determiner determining neighboring pixels of a current block to be used for performing intra prediction on the current block; an information acquirer acquiring, from a bitstream, information indicating one of a plurality of filtering methods used on the neighboring pixels; and a decoder selecting one of the plurality of filtering methods according to the acquired information, filtering the neighboring pixels by using the selected filtering method, and performing the intra prediction on the current block by using the filtered neighboring pixels, wherein the plurality of filtering methods include a spatial domain filtering method and a frequency domain filtering method, wherein the spatial domain filtering method filters the neighboring pixels in a spatial domain, and the frequency domain filtering method filters the neighboring pixels in a frequency domain.

According to another aspect of the present disclosure, there is provided a video encoding apparatus including: a neighboring pixel determiner determining neighboring pixels of a current block to be used for performing intra prediction on the current block; an encoder selecting one of a plurality of filtering methods used for the neighboring pixels, filtering the neighboring pixels by using the selected filtering method, and performing the intra prediction on the current block by using the filtered neighboring pixels; and a bitstream generator generating a bitstream including information indicating the selected filtering method among the plurality of filtering methods, wherein the plurality of filtering methods include a spatial domain filtering method and a frequency domain filtering method, wherein the spatial domain filtering method filters the neighboring pixels in a spatial domain, and the frequency domain filtering method filters the neighboring pixels in a frequency domain.

Advantageous Effects of Disclosure

According to an embodiment, efficiency of prediction may be increased by performing filtering by a method different from a conventional method in intra prediction.

BRIEF DESCRIPTION OF DRAWINGS

FIG. 20 illustrates an operation of determining a depth of a coding unit as the shape and size of the coding unit varies when a plurality of coding units are determined by recursively partitioning the coding unit, according to an embodiment.

BEST MODE

Figure 1A:
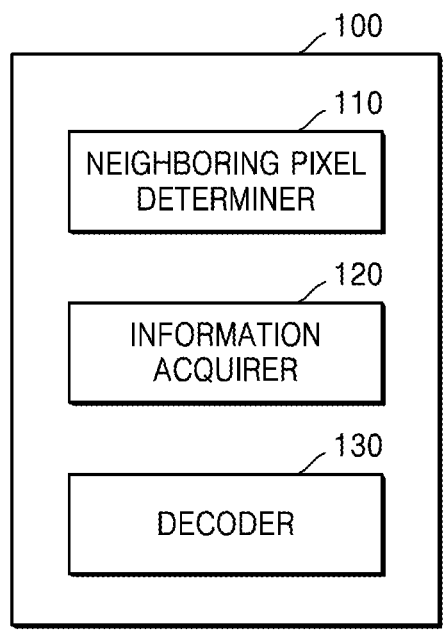
FIG. 1A illustrates a block diagram of a video decoding apparatus according to an embodiment.

According to an aspect of the present disclosure, there is provided a video decoding method including: determining neighboring pixels of a current block to be used for performing intra prediction on the current block; acquiring information indicating one of a plurality of filtering methods used for the neighboring pixels from a bitstream; selecting one of the plurality of filtering methods according to the acquired information; filtering the neighboring pixels by using the selected filtering method; and performing the intra prediction on the current block by using the filtered neighboring pixels, wherein the plurality of filtering methods include a spatial domain filtering method filtering the neighboring pixels in a spatial domain and a frequency domain filtering method filtering the neighboring pixels in a frequency domain.

According to an embodiment, the spatial domain filtering method may include: partitioning the neighboring pixels into predetermined pixel units; obtaining an average value of pixel values with respect to each of the predetermined pixel units; and substituting the average value for a pixel value of pixels included in each of the predetermined pixel units.

According to an embodiment, the partitioning of the neighboring pixels into the predetermined pixel units may include partitioning the neighboring pixels into the predetermined pixel units based on image characteristics of the neighboring pixels.

According to an embodiment, the partitioning of the neighboring pixels into the predetermined pixel units may include: generating a histogram with respect to a pixel value of the neighboring pixels; setting sections of a pixel value in the histogram based on at least one threshold value; and determining pixels, which are adjacent to each other and have the pixel value belonging to the same section of the histogram, as one pixel unit.

According to an embodiment, the partitioning of the neighboring pixels into the predetermined pixel units may include: generating a gradient value of the neighboring pixels by performing a gradient operation on the neighboring pixels; and determining a boundary between the predetermined pixel units by using one or more of the neighboring pixels having a gradient value greater than or equal to a threshold value.

According to an embodiment, the partitioning of the neighboring pixels into the predetermined pixel units may include: extracting edge information included in the neighboring pixels; and partitioning the neighboring pixels into the predetermined pixel units based on the extracted edge information.

According to an embodiment, the spatial domain filtering method may further include filtering a boundary between the predetermined pixel units.

According to an embodiment, the frequency domain filtering method may include: transforming the neighboring pixels into the frequency domain; filtering the transformed neighboring pixels; and inverse-transforming the filtered neighboring pixels into the spatial domain.

According to an embodiment, the filtering of the transformed neighboring pixels may include filtering the transformed neighboring pixels by using a low-pass filter.

According to an embodiment, the spatial domain filtering method and the frequency domain filtering method may filter a block including the neighboring pixels, and a region corresponding to the neighboring pixels in the filtered block may be used for the intra prediction on the current block.

According to another aspect of the present disclosure, there is provided a video decoding apparatus including: a neighboring pixel determiner configured to determine neighboring pixels of a current block to be used for performing intra prediction on the current block; an information acquirer configured to acquire information indicating one of a plurality of filtering methods used for the neighboring pixels from a bitstream; and a decoder configured to select one of the plurality of filtering methods according to the acquired information, filter the neighboring pixels by using the selected filtering method, and perform the intra prediction on the current block by using the filtered neighboring pixels, wherein the plurality of filtering methods include a spatial domain filtering method filtering the neighboring pixels in a spatial domain and a frequency domain filtering method filtering the neighboring pixels in a frequency domain.

According to another aspect of the present disclosure, there is provided a video encoding method including: determining neighboring pixels of a current block to be used for performing intra prediction on the current block; selecting one of a plurality of filtering methods used for the neighboring pixels; filtering the neighboring pixels by using the selected filtering method; and performing the intra prediction on the current block by using the filtered neighboring pixels, wherein the plurality of filtering methods include a spatial domain filtering method filtering the neighboring pixels in a spatial domain and a frequency domain filtering method filtering the neighboring pixels in a frequency domain.

According to an embodiment, the selecting may include: filtering the neighboring pixels by using each of the plurality of filtering methods; performing the intra prediction on the current block by using the filtered neighboring pixels; and selecting one of the plurality of filtering methods based on a cost according to a result of the intra prediction.

According to another aspect of the present disclosure, there is provided a video encoding apparatus including: a neighboring pixel determiner configured to determine neighboring pixels of a current block to be used for intra prediction on the current block; an encoder configured to select one of a plurality of filtering methods used for the neighboring pixels, filter the neighboring pixels by using the selected filtering method, and perform the intra prediction on the current block by using the filtered neighboring pixels; and a bitstream generator configured to generate a bitstream including information indicating the selected filtering method among the plurality of filtering methods, wherein the plurality of filtering methods include a spatial domain filtering method filtering the neighboring pixels in a spatial domain and a frequency domain filtering method filtering the neighboring pixels in a frequency domain.

Mode of Disclosure

The accompanying drawings for illustrating embodiments of the present disclosure are referred to in order to gain a sufficient understanding of the present disclosure, the merits thereof, and the objectives accomplished by the implementation of the present disclosure. The present disclosure may, however, be embodied in many different forms and should not be construed as being limited to the embodiments set forth herein; rather, these embodiments are provided such that this disclosure will be thorough and complete, and will fully convey the present disclosure to those of ordinary skill in the art.

The terms used in the specification will be briefly described, and embodiments of the present disclosure will be described in detail.

The terms used herein are those general terms currently widely used in the art in consideration of functions in regard to the present disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of the present disclosure. Thus, the terms used herein should be understood not as simple names but based on the meanings of the terms and the overall description of the present disclosure.

As used herein, the singular forms "a", "an", and "the" are intended to include the plural forms as well, unless the context clearly indicates otherwise.

Throughout the specification, when something is referred to as "including" a component, another component may be further included unless specified otherwise. Also, the term "unit" used herein means a software component or a hardware component such as a field-programmable gate array (FPGA) or an application-specific integrated circuit (ASIC), and the "unit" performs some functions. However, the "unit" is not limited to software or hardware. The "unit" may be formed so as to be in an addressable storage medium, or may be formed so as to operate one or more processors. Thus, for example, the "unit" may include components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

Hereinafter, the term "image" may refer to a static image such as a still image of a video, or a dynamic image such as a moving image, that is, a video itself.

Hereinafter, the term "sample" may refer to data that is assigned to a sampling position of an image and is to be processed. For examples, samples may be pixel values in an image of a spatial domain and transformation coefficients on a transformation domain. Herein, a unit including at least one or more samples may be defined as a block.

Hereinafter, embodiments of the present disclosure will be described in detail with reference to the accompanying drawings so that those of ordinary skill in the art may easily implement the embodiments. While describing one or more embodiments of the present disclosure, descriptions about drawings that are not related to the one or more embodiments of the present disclosure will be omitted for conciseness.

FIG. 1A illustrates a block diagram of a video decoding apparatus 100 according to an embodiment.

As illustrated in FIG. 1A, a video decoding apparatus 100 according to an embodiment may include a neighboring pixel determiner 110, an information acquirer 120, and a decoder 130.

The neighboring pixel determiner 110 may determine neighboring pixels of a current block to be used for performing intra prediction on the current block. According to an embodiment, when the size of the current block is nT*nT, the neighboring pixels may be one row or column of one-dimensional pixels including 2nT pixels adjacent to the top side of the current block, 2nT pixels adjacent to the left side of the current block, and one pixel on the left top of the current block. However, the neighboring pixels are not limited to the above embodiment and may have various shapes around the current block. For example, the neighboring pixels may be two or more rows or columns of two-dimensional pixels including pixels adjacent to the current block.

The information acquirer 120 may acquire information indicating one of a plurality of filtering methods used for the neighboring pixels from a bitstream. For example, the information indicating one of the plurality of filtering methods may be index information.

According to an embodiment, the information acquirer 120 may further acquire information indicating whether to perform filtering on the neighboring pixels from the bitstream, and the decoder 130 may determine whether to perform filtering on the neighboring pixels according to the acquired information. For example, the information indicating whether to perform filtering on the neighboring pixels may be a flag.

According to an embodiment, the plurality of filtering methods may include a spatial domain filtering method filtering the neighboring pixels in a spatial domain and a frequency domain filtering method filtering the neighboring pixels in a frequency domain.

According to an embodiment, the spatial domain filtering method may include: partitioning the neighboring pixels into predetermined pixel units; obtaining an average value of pixel values with respect to each of the predetermined pixel units; and substituting the average value for a pixel value of pixels included in each of the predetermined pixel units.

According to an embodiment, the frequency domain filtering method may include: transforming the neighboring pixels into the frequency domain; filtering the transformed neighboring pixels; and inverse-transforming the filtered neighboring pixels into the spatial domain.

The decoder 130 may select one of the plurality of filtering methods according to the acquired information, filter the neighboring pixels by using the selected filtering method, and perform the intra prediction on the current block by using the filtered neighboring pixels.

Figure 1B:
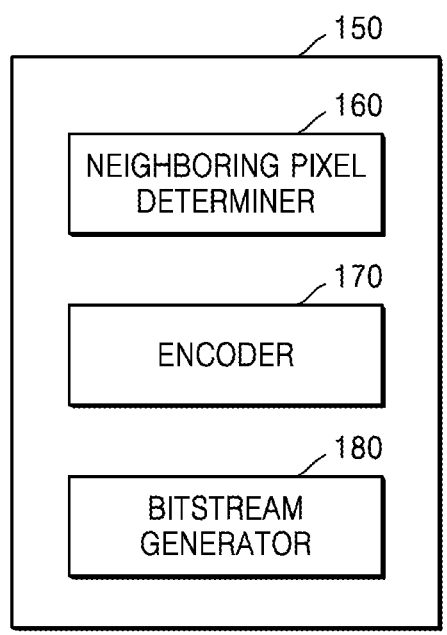
FIG. 1B illustrates a block diagram of a video encoding apparatus according to an embodiment.

FIG. 1B illustrates a block diagram of a video encoding apparatus 150 according to an embodiment.

As illustrated in FIG. 1 B, a video encoding apparatus 150 according to an embodiment may include a neighboring pixel determiner 160, an encoder 170, and a bitstream generator 180.

The neighboring pixel determiner 160 may determine neighboring pixels of a current block to be used for performing intra prediction on the current block.

The encoder 170 may select one of a plurality of filtering methods used for the neighboring pixels, filter the neighboring pixels by using the selected filtering method, and perform the intra prediction on the current block by using the filtered neighboring pixels.

According to an embodiment, the encoder 170 of the video encoding apparatus 150 may filter the neighboring pixels by using each of the plurality of filtering methods, perform the intra prediction on the current block by using the filtered neighboring pixels, and select one of the plurality of filtering methods based on a cost according to the intra prediction result. For example, the cost according to the intra prediction result may be calculated through Mean Square Error (MSE), Sum of Absolute Transformed Differences (SATD), or Rate Distortion Optimization (RDO), and the most cost-effective filtering method may be selected.

The bitstream generator 180 may generate a bitstream including information indicating the selected filtering method among the plurality of filtering methods. For example, the information indicating one of the plurality of filtering methods may be index information.

According to an embodiment, the encoder 170 may determine whether to perform filtering on the neighboring pixels based on parameters such as a size of a block, a prediction mode of the block, an intra-prediction direction, neighboring coding information, user input, and operation complexity, and accordingly, the bitstream generator 180 may generate a bitstream further including information indicating whether to perform filtering on the neighboring pixels. For example, the information indicating whether to perform filtering on the neighboring pixels may be a flag.

According to an embodiment, whether to perform filtering on the neighboring pixels and the filtering method to be applied may be determined for each coding unit (CU), prediction unit (PU), and transform unit (TU), and for example, whether to perform determination for each transform unit may be determined in the coding unit and then determination may be performed for each transform unit.

According to an embodiment, the information indicating whether to perform filtering on the neighboring pixels may be further acquired from the bitstream, and the decoder 130 may determine whether to perform filtering on the neighboring pixels according to the acquired information.

Figure 2:
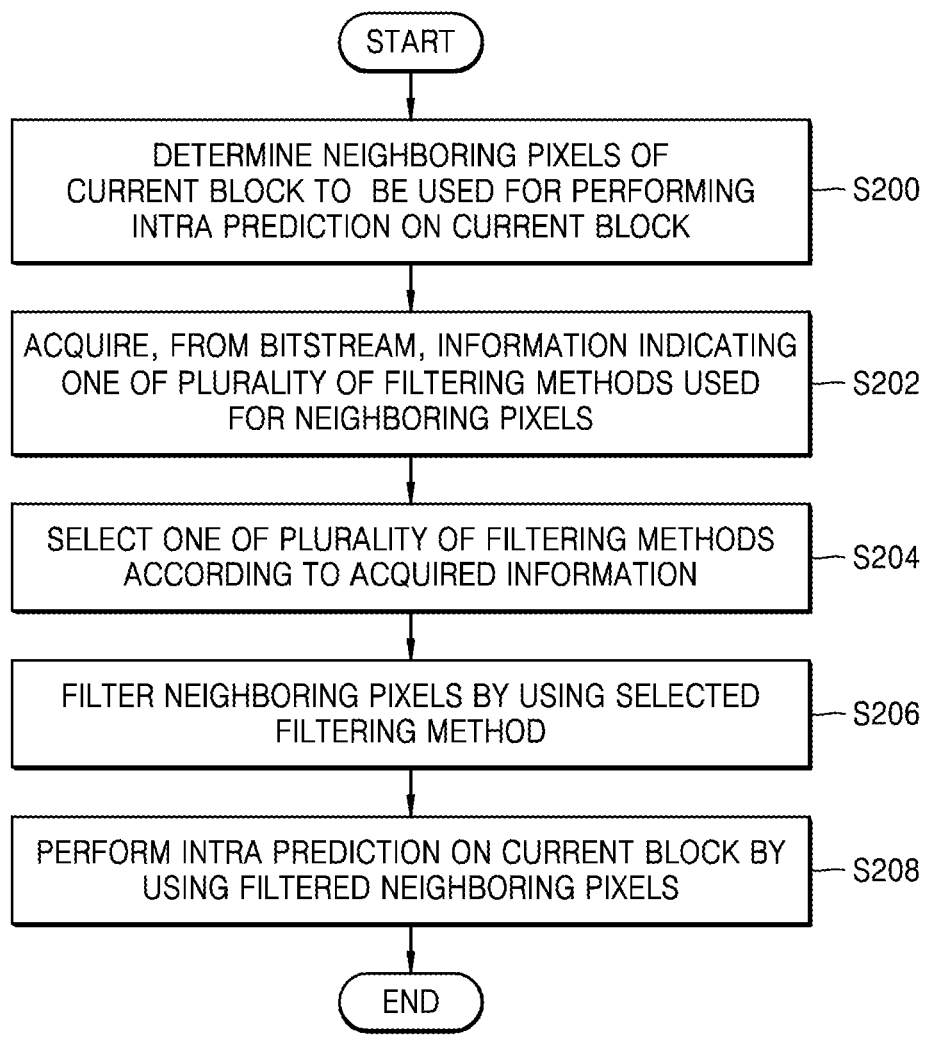
FIG. 2 illustrates a flowchart of a video decoding method according to an embodiment.

FIG. 2 illustrates a flow diagram of a video decoding method according to an embodiment.

In operation S200, the neighboring pixel determiner 110 of the video decoding apparatus 100 may determine neighboring pixels of a current block to be used for intra prediction on the current block.

In operation S202, the information acquirer 120 of the video decoding apparatus 100 may acquire information indicating one of a plurality of filtering methods used for the neighboring pixels from a bitstream.

According to an embodiment, the plurality of filtering methods may include a spatial domain filtering method filtering the neighboring pixels in a spatial domain and a frequency domain filtering method filtering the neighboring pixels in a frequency domain.

In operation S204, the decoder 130 of the video decoding apparatus 100 may select one of the plurality of filtering methods according to the acquired information.

In operation S206, the decoder 130 of the video decoding apparatus 100 may filter the neighboring pixels by using the selected filtering method.

In operation S208, the decoder 130 of the video decoding apparatus 100 may perform the intra prediction on the current block by using the filtered neighboring pixels.

Figure 3:
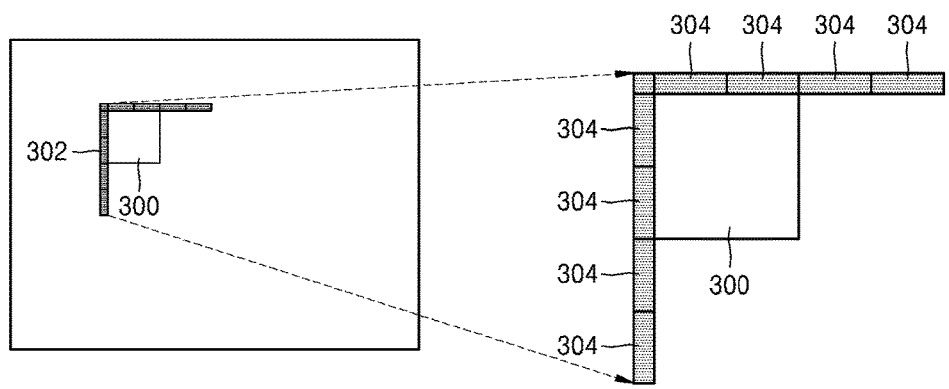
FIG. 3 illustrates determination of neighboring pixels to be used for intra prediction on a current block and partitioning of the neighboring pixels, according to an embodiment.

FIG. 3 illustrates determining neighboring pixels to be used for intra prediction on a current block and partitioning the neighboring pixels according to an embodiment.

As illustrated in FIG. 3, neighboring pixels 302 to be used for intra prediction on a current block 300 may be determined. According to an embodiment, the size of the current block 300 may be 8×8. The neighboring pixels 302 may be one-dimensional pixels including 16 pixels adjacent to the top side of the current block, 16 pixels adjacent to the left side of the current block, and one pixel on the left top of the current block.

The spatial domain filtering method and the frequency domain filtering method according to an embodiment may include partitioning the neighboring pixels 302 into predetermined pixel units 304. The predetermined pixel units 304 may include 1×4 pixels as illustrated in FIG. 3.

According to an embodiment, the spatial domain filtering method may obtain an average value of pixel values with respect to each of a plurality of predetermined pixel units partitioned after partitioning of the neighboring pixels 302 and substitute the average value for a pixel value of pixels included in each of the predetermined pixel units, to perform filtering on the plurality of predetermined pixel units partitioned.

According to an embodiment, the frequency domain filtering method may transform the neighboring pixels into the frequency domain, filter the transformed neighboring pixels, and inverse-transform the filtered neighboring pixels into the spatial domain, to perform filtering on the neighboring pixels. Also, with respect to each of a plurality of predetermined pixel units partitioned, the frequency domain filtering method may transform the predetermined pixel unit into the frequency domain, filter the transformed predetermined pixel unit, and inverse-transform the filtered predetermined pixel unit into the spatial domain, to perform filtering on the plurality of predetermined pixel units.

According to an embodiment, in the frequency domain filtering method, the neighboring pixels may be frequency-transformed by using various frequency transformation methods such as Discrete Cosine Transform (DCT), Hadamard Transform, and Karhunen-Loeve Transform (KLT).

According to an embodiment, the spatial domain filtering method and the frequency domain filtering method may further include filtering a boundary between the filtered pixel units. For example, the boundary between the filtered pixel units may be further filtered by using a [1 2 1] filter. Assuming that the pixel value of a pixel located at the boundary between the filtered pixel units is B and the pixel values of pixels adjacent to both sides thereof are A and C respectively, according to the additional [1 2 1] filtering, the filtered boundary pixel value may be calculated as (A+2B+C)/4. The neighboring pixels 302 may be smoothed through additional filtering on the boundary between the predetermined pixel units.

According to an embodiment, in the spatial domain filtering method and the frequency domain filtering method, the partitioning of the neighboring pixels into the predetermined pixel units may include partitioning the neighboring pixels into the predetermined pixel units based on the image characteristic of the neighboring pixels. Hereinafter, a method of partitioning the neighboring pixels based on the image characteristics thereof will be described with reference to FIGS. 4 and 5.

Figure 4:
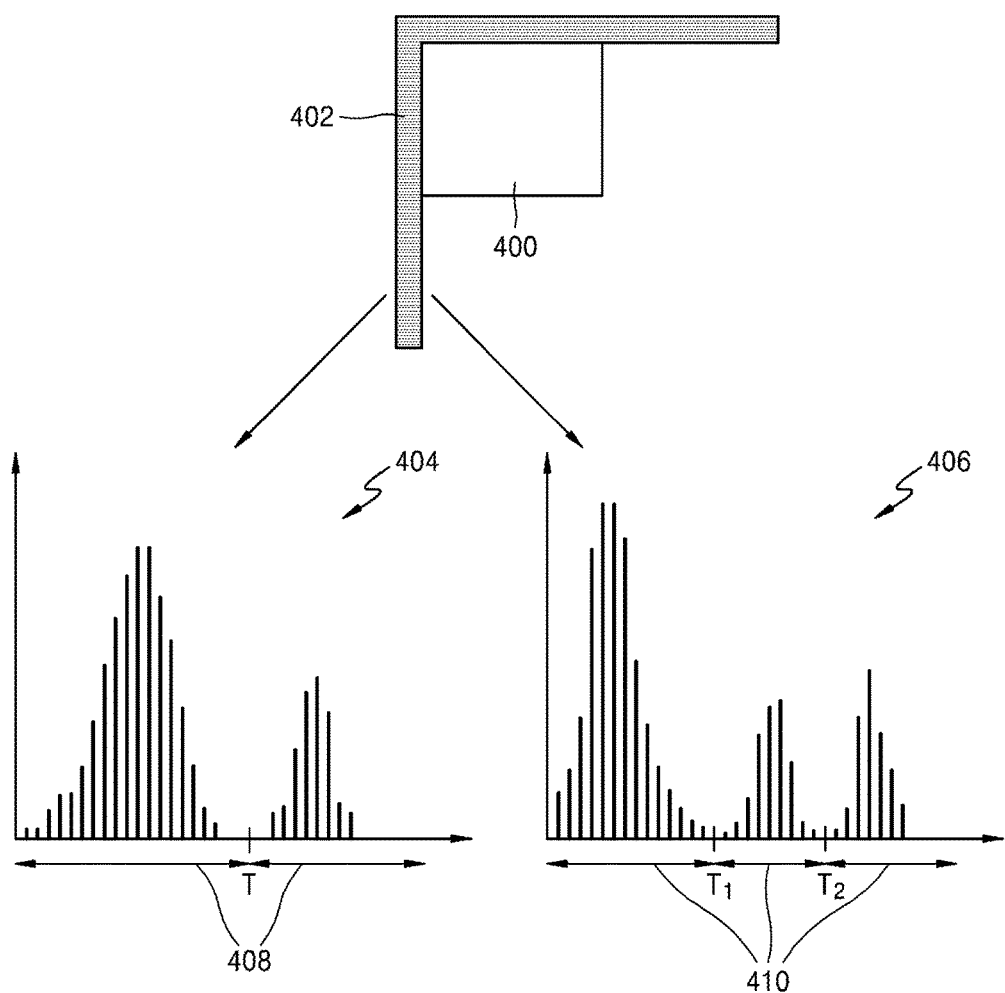
FIG. 4 illustrates partitioning of neighboring pixels of a current block, according to another embodiment.

FIG. 4 illustrates partitioning neighboring pixels of a current block according to another embodiment.

According to an embodiment, the neighboring pixels may be partitioned by using a histogram section of pixel values among the image characteristics of the neighboring pixels of the current block. As illustrated in FIG. 4, neighboring pixels 402 of a current block 400 to be used for intra prediction on the current block 400 may be determined.

For the partitioning of the neighboring pixels, a histogram may be generated for the pixel values of the neighboring pixels 402. For example, histograms 404 and 406 may be generated according to the pixel value distribution of the neighboring pixels 402 as illustrated in FIG. 4. The horizontal axis of the histogram may represent pixel values, and the vertical axis thereof may represent frequencies. In the histogram 404, one threshold value T may be determined according to the distribution of pixel values, and two sections 408 of the histogram may be set based on the determined threshold value T. Also, in the histogram 406, two threshold values $T_1$ and $T_2$ may be determined according to the distribution of pixel values, and three sections 410 of the histogram may be set based on the determined two threshold values $T_1$ and $T_2$.

According to an embodiment, the partitioning of the neighboring pixels may be performed by determining the pixels, which are adjacent to each other and have the pixel value belonging to the same section of the histogram, as one pixel unit.

Figure 5:
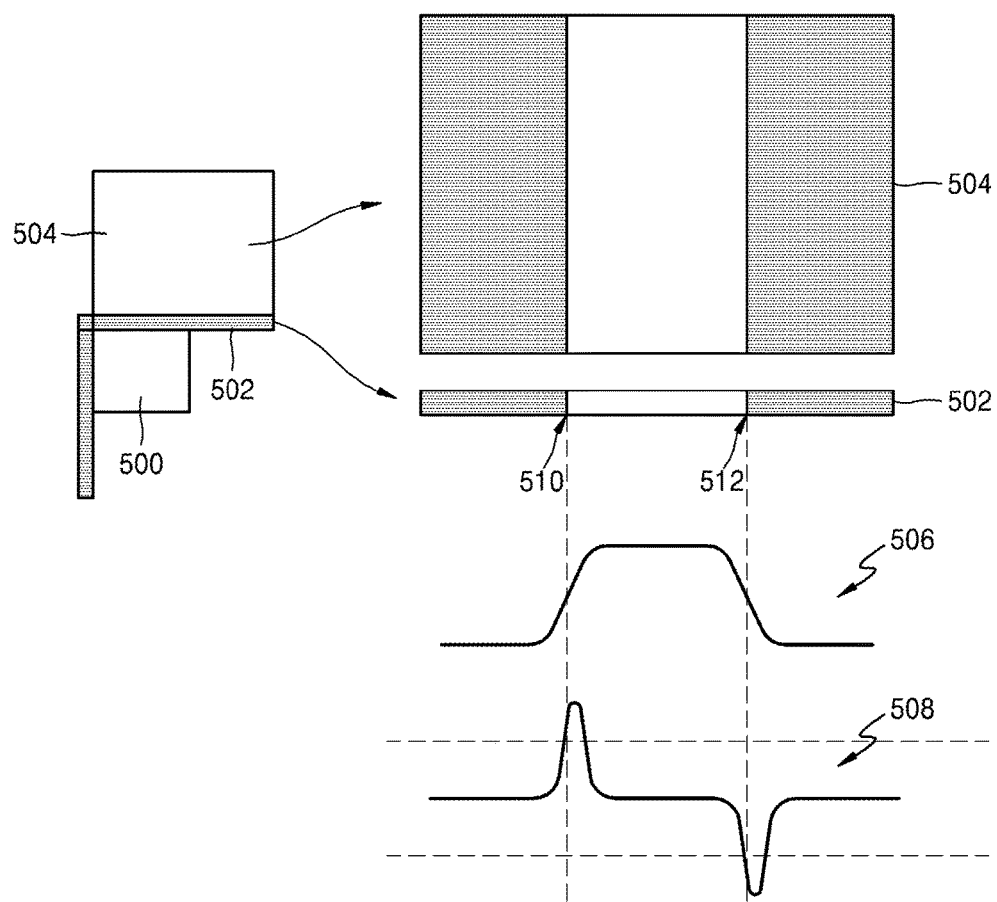
FIG. 5 illustrates partitioning of neighboring pixels of a current block, according to another embodiment.

FIG. 5 illustrates partitioning neighboring pixels of a current block according to another embodiment.

According to an embodiment, the neighboring pixels may be partitioned by using a gradient value among the image characteristics of the neighboring pixels of the current block. As illustrated in FIG. 5, neighboring pixels 502 of a current block 500 to be used for intra prediction on the current block 500 may be determined. A block 504 located on the top side of the current block 500 may include a portion of the neighboring pixels 502.

According to an embodiment, a gradient value of the neighboring pixels 502 may be generated by performing a gradient operation on the neighboring pixels 502. For example, when the neighboring pixels 502 and the block 504 have image characteristics illustrated in FIG. 5, the pixel values and the gradient values of the neighboring pixels 502 may form a pixel value distribution 506 and a gradient value distribution 508.

According to an embodiment, the boundary between predetermined pixel units may be determined by using one or more of the pixels having a gradient value greater than or equal to a threshold value. For example, as illustrated in FIG. 5, a threshold value T of the gradient value may be determined, and boundaries 510 and 512 may be determined by the pixels having the maximum and minimum gradient values among the pixels having the gradient value greater than or equal to the determined threshold value T. The neighboring pixels 502 may be partitioned into predetermined pixel units with the determined boundaries 510 and 512 as the boundary between the predetermined pixel units.

According to an embodiment, the neighboring pixels may be partitioned into predetermined pixel units by using edge information among the image characteristics of the neighboring pixels of the current block. The edge information included in the neighboring pixels may be extracted through various methods. For example, the edge information may be extracted through the boundary determined through the gradient value as described with reference to FIG. 5.

Figure 6:
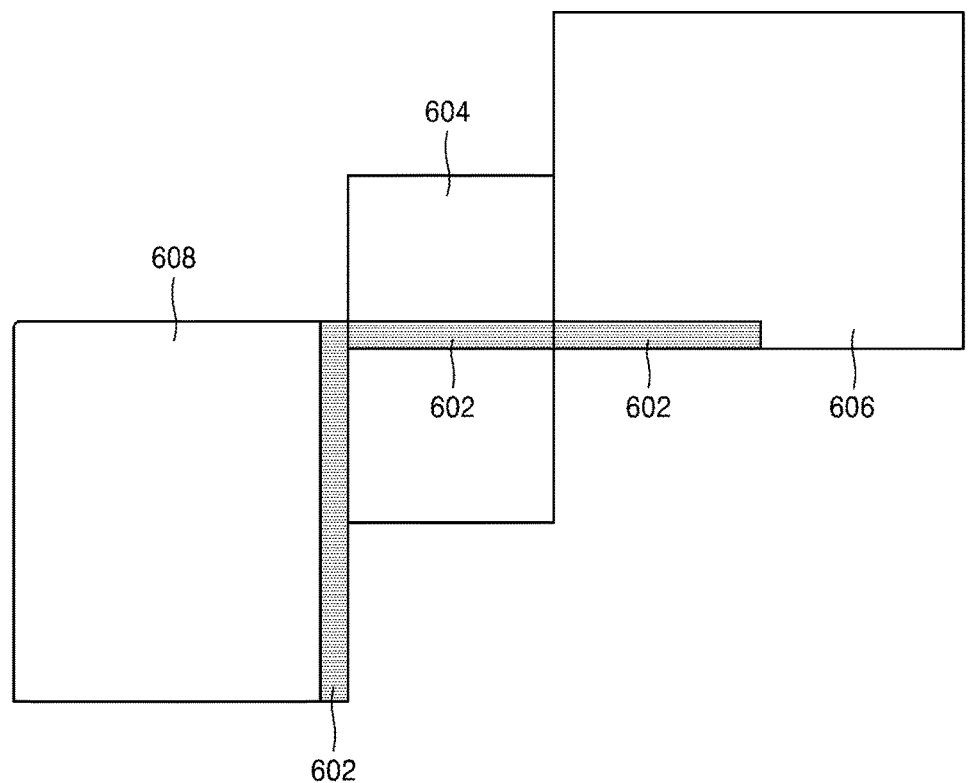
FIG. 6 is a reference diagram illustrating a method of filtering neighboring pixels, according to an embodiment.

FIG. 6 is a reference diagram illustrating a method of filtering neighboring pixels according to an embodiment.

According to an embodiment, the spatial domain filtering method and the frequency domain filtering method may filter the entire block including the neighboring pixels, instead of filtering only the neighboring pixels of the current block. For example, as illustrated in FIG. 6, in the spatial domain filtering method and the frequency domain filtering method, all of blocks 604, 606, and 608 including neighboring pixels 602 of a current block may be filtered.

According to an embodiment, when the spatial domain filtering method and the frequency domain filtering method filter the entire block including the neighboring pixels, only a region corresponding to the neighboring pixels in the filtered block may be used for intra prediction on the current block.

Figure 7A:
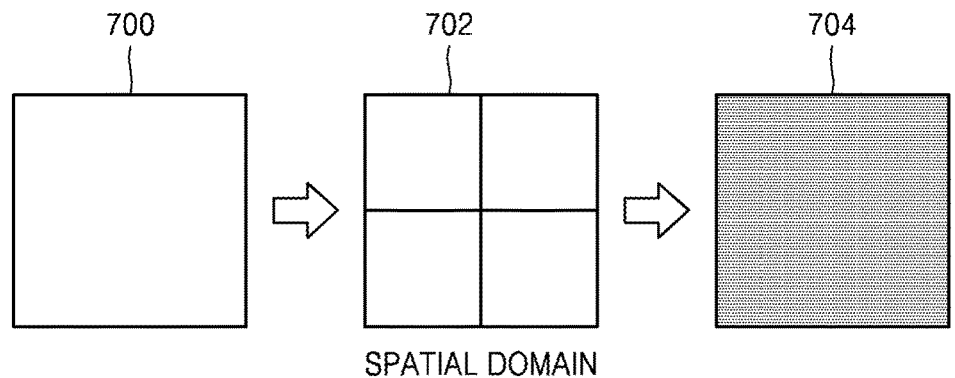
FIG. 7A is a reference diagram illustrating a spatial domain filtering method according to an embodiment.

FIG. 7A is a reference diagram illustrating a spatial domain filtering method according to an embodiment.

According to an embodiment, the spatial domain filtering method may filter the entire block including the neighboring pixels. For example, as illustrated in FIG. 7A, a block 700 including neighboring pixels may be partitioned into predetermined pixel units 702. Filtering may be performed on each of the predetermined pixel units 702 in the spatial domain, and a filtered block 704 may be generated by the filtering.

According to an embodiment, when the spatial domain filtering method filters the entire block including the neighboring pixels, only a region corresponding to the neighboring pixels in the filtered block may be used for intra prediction on the current block.

According to an embodiment, the spatial domain filtering method described with reference to FIG. 7A may also be applied to the neighboring pixels determined as two-dimensional pixels.

Figure 7B:
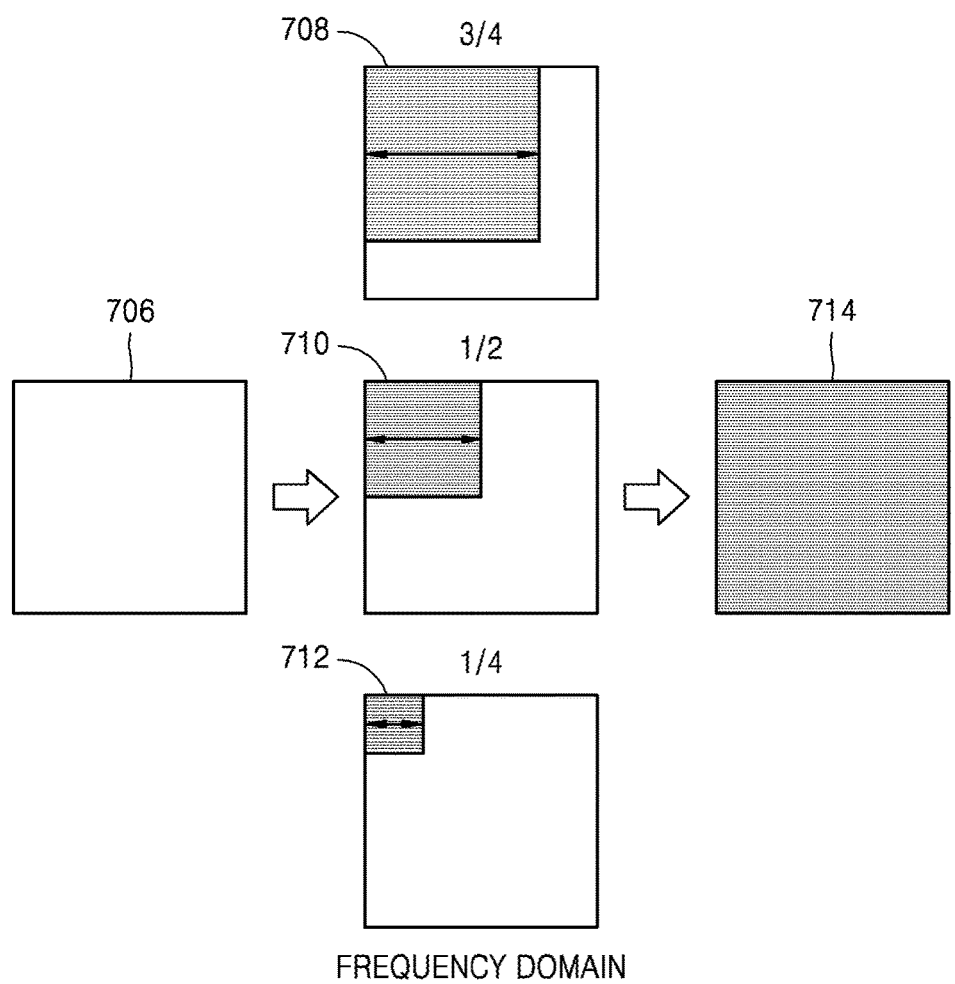
FIG. 7B is a reference diagram illustrating a frequency domain filtering method according to an embodiment.

FIG. 7B is a reference diagram illustrating a frequency domain filtering method according to an embodiment.

According to an embodiment, the frequency domain filtering method may filter the entire block including the neighboring pixels. For example, as illustrated in FIG. 7B, a block 706 including neighboring pixels may be transformed into the frequency domain, and the transformed block may be filtered in the frequency domain. The block 706 may be frequency-transformed by using two-dimensional DCT; however, the present disclosure is not limited thereto.

According to an embodiment, in the frequency domain filtering method, the block transformed into the frequency domain may be filtered by using a low-pass filter. For example, as illustrated in FIG. 7B, transformed blocks 708, 710, and 712 may be filtered by leaving only the low-frequency region. Other values of the block 708, the block 710, and the block 712 may be deleted with only leaving a ¾ region, a ½ region, and a ¼ region, respectively.

According to an embodiment, in the frequency domain filtering method, filtering may be adaptively performed on different current blocks based on parameters such as a size of a block, a prediction mode of the block, an intra prediction direction, neighboring coding information, user input, and operation complexity.

According to an embodiment, the block filtered in the frequency domain may be transformed into the spatial domain through inverse transformation. For example, the blocks 708, 710, and 712 may be filtered and then transformed into the spatial domain through the inverse transformation of two-dimensional DCT.

According to an embodiment, when the frequency domain filtering method filters the entire block including the neighboring pixels, only a region corresponding to the neighboring pixels in the filtered block may be used for intra prediction on the current block.

According to an embodiment, the frequency domain filtering method described with reference to FIG. 7B may also be applied to the neighboring pixels determined as two-dimensional pixels.

Figure 8:
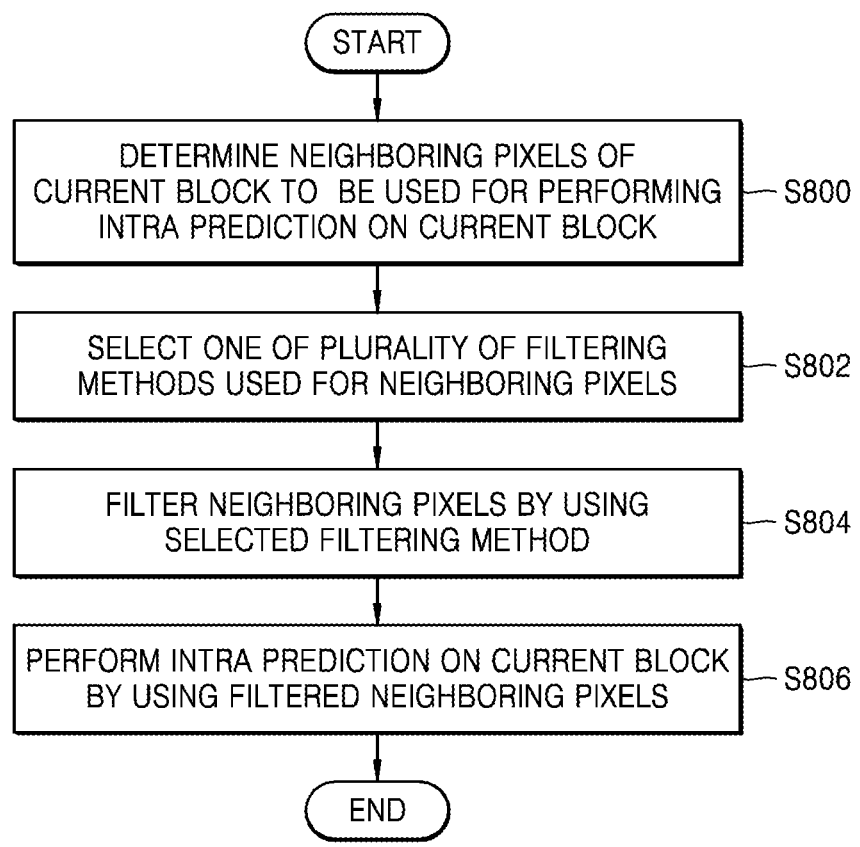
FIG. 8 illustrates a flowchart of a video encoding method according to an embodiment.

FIG. 8 illustrates a flow diagram of a video encoding method according to an embodiment.

In operation S800, the neighboring pixel determiner 160 of the video encoding apparatus 150 may determine neighboring pixels of a current block to be used for intra prediction on the current block.

In operation S802, the encoder 170 of the video encoding apparatus 150 may select one of a plurality of filtering methods used for the neighboring pixels.

According to an embodiment, the plurality of filtering methods may include a spatial domain filtering method filtering the neighboring pixels in a spatial domain and a frequency domain filtering method filtering the neighboring pixels in a frequency domain.

According to an embodiment, the encoder 170 of the video encoding apparatus 150 may filter the neighboring pixels by using each of the plurality of filtering methods, perform the intra prediction on the current block by using the filtered neighboring pixels, and select one of the plurality of filtering methods based on a cost according to the intra prediction result. For example, the cost according to the intra prediction result may be calculated through Mean Square Error (MSE), Sum of Absolute Transformed Differences (SATD), or Rate Distortion Optimization (RDO), and the most cost-effective filtering method may be selected.

In operation S804, the encoder 170 of the video encoding apparatus 150 may filter the neighboring pixels by using the selected filtering method.

In operation S806, the encoder 170 of the video encoding apparatus 150 may perform the intra prediction on the current block by using the filtered neighboring pixels.

The video encoding method according to an embodiment may further include generating a bitstream including information indicating the selected filtering method among the plurality of filtering methods.

Figure 9:
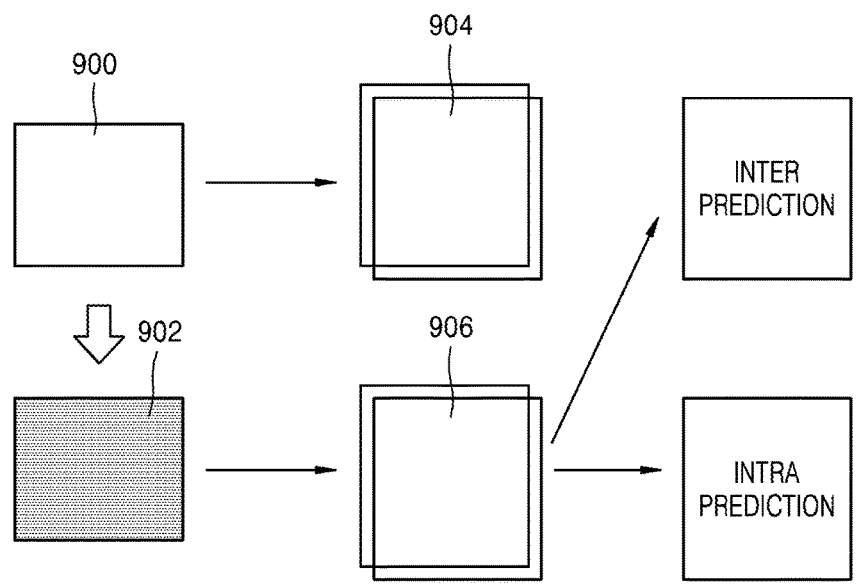
FIG. 9 is a reference diagram illustrating storage of a reference sample generated through filtering in a buffer, according to an embodiment.

FIG. 9 is a reference diagram illustrating storing a reference sample generated through filtering in a buffer according to an embodiment.

According to an embodiment, a difference coefficient block may be generated through predictive coding on an input image, and the generated difference coefficient block may undergo transformation and quantization. A reconstruction difference coefficient block may be generated through inverse quantization and inverse transformation of the difference coefficient block that has undergone transformation and quantization. A reconstructed block may be generated by adding a prediction block to the reconstruction difference coefficient block. The generated reconstructed block may be used as a reference sample in intra prediction.

According to an embodiment, the spatial domain filtering method according to various embodiments described above may be applied to the block reconstructed in the spatial domain, and the frequency domain filtering method according to various embodiments described above may be applied to the block reconstructed in the frequency domain.

According to an embodiment, as illustrated in FIG. 9, a reconstructed block 900 may be stored in a reconstructed picture buffer 904 through a predetermined process for use in inter prediction. A plurality of filtering methods including the spatial domain filtering method and the frequency domain filtering method described above may be applied to the reconstructed block 900, and a filtered block 902 may be generated as illustrated in FIG. 9. The filtered block 902 may be stored in a separate picture buffer 906 that is different from the reconstructed picture buffer 904. According to another embodiment, only a region of the filtered block 902 to be used later for intra prediction or inter prediction may be selectively stored in the picture buffer 906.

According to an embodiment, as illustrated in FIG. 9, the filtered block 902 may be stored in the picture buffer 906 and may be used as a reference sample of intra prediction and may also be used in inter prediction.

Hereinafter, a method of determining a data unit that may be used in the process of decoding an image by the video decoding apparatus 100 according to an embodiment will be described with reference to FIGS. 10 to 23. The operation of the video encoding apparatus 150 may be similar to or opposite to various embodiments of the operation of the video decoding apparatus 100 described below.

Figure 10:
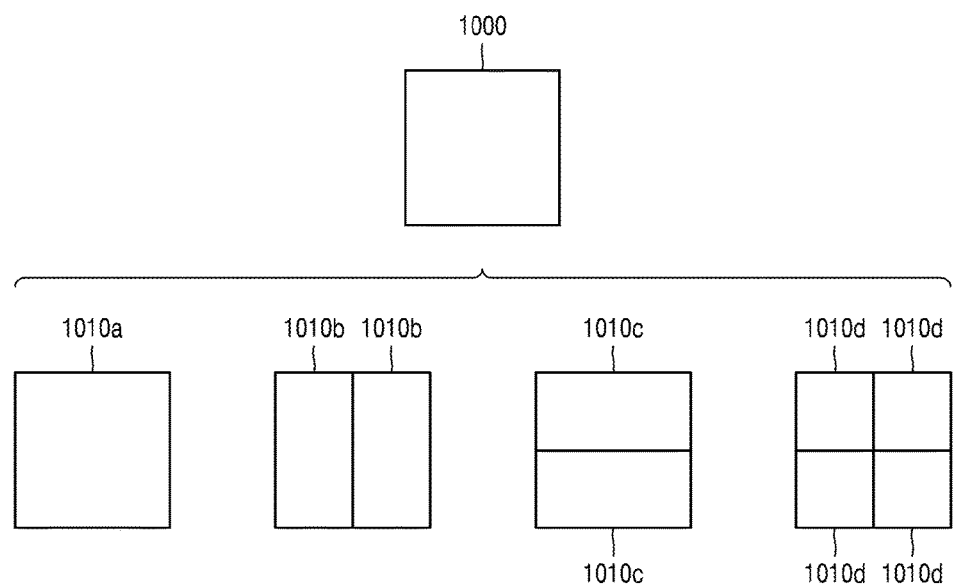
FIG. 10 illustrates an operation of determining one or more coding units by partitioning a current coding unit, according to an embodiment.

FIG. 10 illustrates an operation, performed by the video decoding apparatus 100, of determining one or more coding units by partitioning a current coding unit, according to an embodiment.

According to an embodiment, the video decoding apparatus 100 may determine a shape of a coding unit by using block shape information, and determine a partitioning method of the coding unit by using partition shape information. That is, a coding unit partitioning method indicated by the partition shape information may be determined based on a block shape indicated by the block shape information used by the video decoding apparatus 100.

According to an embodiment, the video decoding apparatus 100 may use the block shape information indicating that the current coding unit has a square shape. For example, the video decoding apparatus 100 may determine whether not to partition a square coding unit, whether to vertically partition the square coding unit, whether to horizontally partition the square coding unit, or whether to partition the square coding unit into four coding units, based on the partition shape information. Referring to FIG. 10, when the block shape information of a current coding unit 1000 indicates a square shape, the video decoding apparatus 100 may determine that a coding unit 1010a having the same size as the current coding unit 1000 is not partitioned, based on the partition shape information indicating not to perform partitioning, or may determine coding units 1010b, 1010c, or 1010d partitioned based on the partition shape information indicating a predetermined partitioning method.

Referring to FIG. 10, according to an embodiment, the video decoding apparatus 100 may determine two coding units 1010b obtained by partitioning the current coding unit 1000 in a vertical direction, based on the partition shape information indicating to perform partitioning in a vertical direction. The video decoding apparatus 100 may determine two coding units 1010c obtained by partitioning the current coding unit 1000 in a horizontal direction, based on the partition shape information indicating to perform partitioning in a horizontal direction. The video decoding apparatus 100 may determine four coding units 1010d obtained by partitioning the current coding unit 1000 in vertical and horizontal directions, based on the partition shape information indicating to perform partitioning in vertical and horizontal directions. However, partitioning methods of the square coding unit are not limited to the above-described methods, and the partition shape information may indicate various methods. Predetermined partitioning methods of partitioning the square coding unit will be described in detail below in relation to various embodiments.

Figure 11:
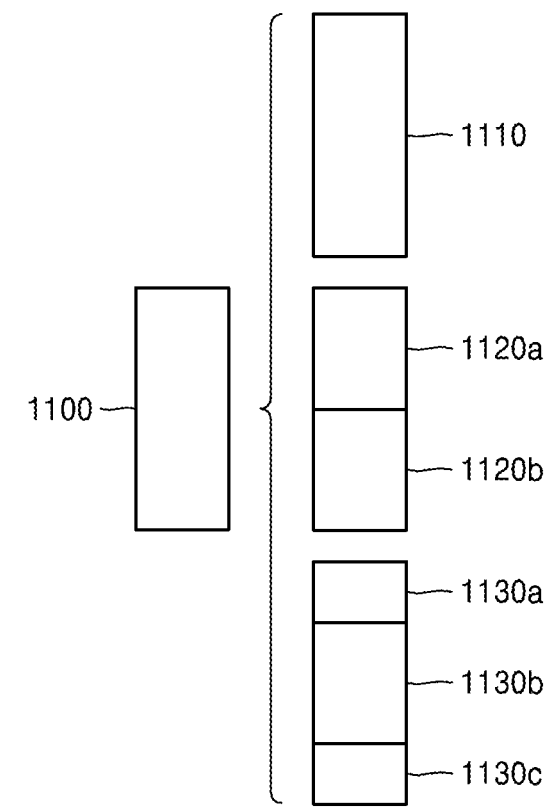
FIG. 11 illustrates an operation of determining one or more coding units by partitioning a non-square coding unit, according to an embodiment.
Figure 11:
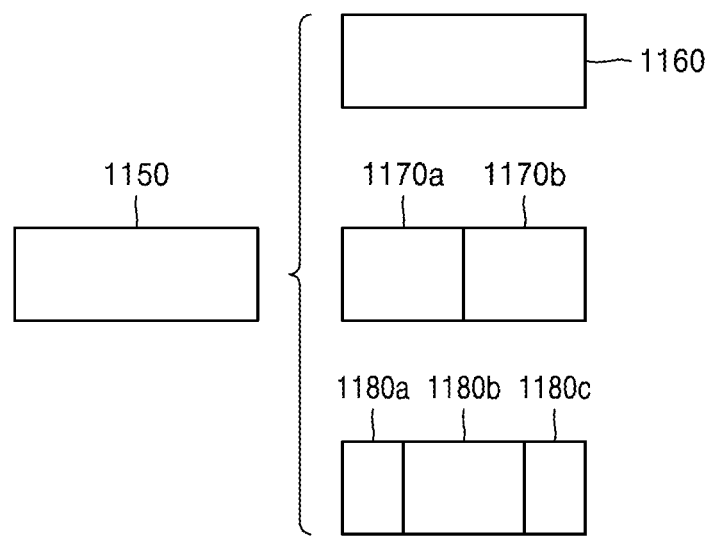

FIG. 11 illustrates an operation, performed by the video decoding apparatus 100, of determining one or more coding units by partitioning a non-square coding unit, according to an embodiment.

According to an embodiment, the video decoding apparatus 100 may use block shape information indicating that a current coding unit has a non-square shape. The video decoding apparatus 100 may determine whether not to partition the non-square current coding unit or whether to partition the non-square current coding unit by using a predetermined partitioning method, based on partition shape information. Referring to FIG. 11, when the block shape information of a current coding unit 1100 or 1150 indicates a non-square shape, the video decoding apparatus 100 may determine that a coding unit 1110 or 1160 having the same size as the current coding unit 1100 or 1150 is not partitioned, based on the partition shape information indicating not to perform partitioning, or determine coding units 1120a and 1120b, 1130a to 1130c, 1170a and 1170b, or 1180a to 1180c partitioned based on the partition shape information indicating a predetermined partitioning method. Predetermined partitioning methods of partitioning a non-square coding unit will be described in detail below in relation to various embodiments.

According to an embodiment, the video decoding apparatus 100 may determine a partitioning method of a coding unit by using the partition shape information and, in this case, the partition shape information may indicate the number of one or more coding units generated by partitioning a coding unit. Referring to FIG. 11, when the partition shape information indicates to partition the current coding unit 1100 or 1150 into two coding units, the video decoding apparatus 100 may determine two coding units 1120a and 1120b, or 1170a and 1170b included in the current coding unit 1100 or 1150, by partitioning the current coding unit 1100 or 1150 based on the partition shape information.

According to an embodiment, when the video decoding apparatus 100 partitions the non-square current coding unit 1100 or 1150 based on the partition shape information, the location of a long side of the non-square current coding unit 1100 or 1150 may be considered. For example, the video decoding apparatus 100 may determine a plurality of coding units by dividing a long side of the current coding unit 1100 or 1150 considering the shape of the current coding unit 1100 or 1150.

According to an embodiment, when the partition shape information indicates to partition a coding unit into an odd number of blocks, the video decoding apparatus 100 may determine an odd number of coding units included in the current coding unit 1100 or 1150. For example, when the partition shape information indicates to partition the current coding unit 1100 or 1150 into three coding units, the video decoding apparatus 100 may partition the current coding unit 1100 or 1150 into three coding units 1130a, 1130b, and 1130c, or 1180a, 1180b, and 1180c. According to an embodiment, the video decoding apparatus 100 may determine an odd number of coding units included in the current coding unit 1100 or 1150, and not all the determined coding units have the same size. For example, a predetermined coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. That is, coding units which may be determined by partitioning the current coding unit 1100 or 1150 may have multiple sizes and, in some cases, all of the odd number of coding units 1130a, 1130b, and 1130c, or 1180a, 1180b, and 1180c may have different sizes.

According to an embodiment, when the partition shape information indicates to partition a coding unit into an odd number of blocks, the video decoding apparatus 100 may determine an odd number of coding units included in the current coding unit 1100 or 1150, and put a predetermined restriction on at least one coding unit from among the odd number of coding units generated by partitioning the current coding unit 1100 or 1150. Referring to FIG. 11, the video decoding apparatus 100 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by partitioning the current coding unit 1100 or 1150. For example, the video decoding apparatus 100 may restrict the coding unit 1130b or 1180b at the center location to be no longer partitioned or to be partitioned by only a predetermined number of times, unlike the other coding units 1130a and 1130c, or 1180a and 1180c.

Figure 12:
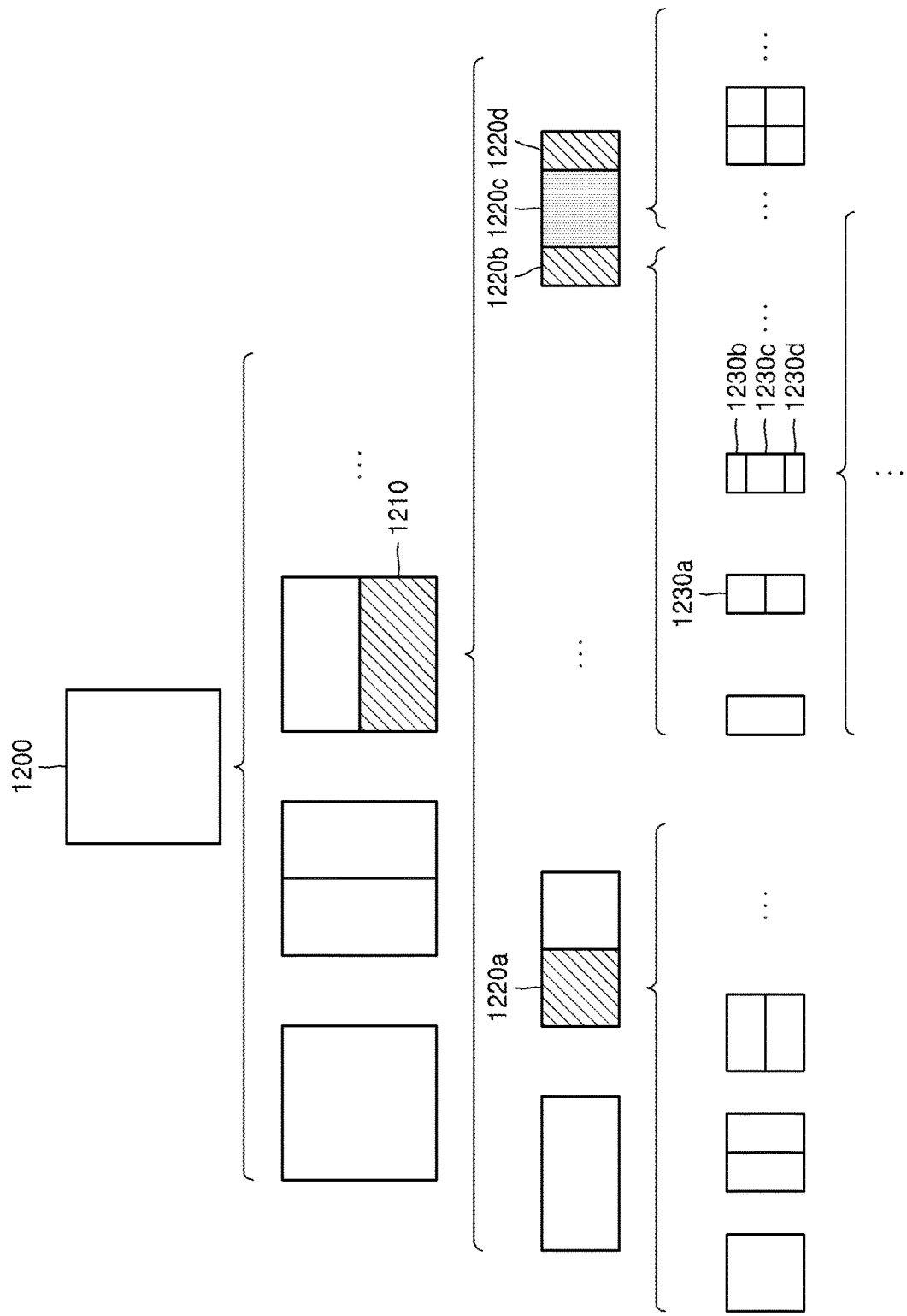
FIG. 12 illustrates an operation of partitioning a coding unit based on at least one of block shape information and partition shape information, according to an embodiment.

FIG. 12 illustrates an operation, performed by the video decoding apparatus 100, of partitioning a coding unit based on at least one of block shape information and partition shape information, according to an embodiment.

According to an embodiment, the video decoding apparatus 100 may determine to or not to partition a square first coding unit 1200 into coding units, based on at least one of the block shape information and the partition shape information. According to an embodiment, when the partition shape information indicates to partition the first coding unit 1200 in a horizontal direction, the video decoding apparatus 100 may determine a second coding unit 1210 by partitioning the first coding unit 1200 in a horizontal direction. A first coding unit, a second coding unit, and a third coding unit used according to an embodiment are terms used to understand a relation before and after partitioning a coding unit. For example, a second coding unit may be determined by partitioning a first coding unit, and a third coding unit may be determined by partitioning the second coding unit. It will be understood that the structure of the first, second, and third coding units follows the above descriptions.

According to an embodiment, the video decoding apparatus 100 may determine to or not to partition the determined second coding unit 1210 into coding units, based on at least one of the block shape information and the partition shape information. Referring to FIG. 12, the video decoding apparatus 100 may or may not partition the non-square second coding unit 1210, which is determined by partitioning the first coding unit 1200, into one or more third coding units 1220*a*, or 1220*b*, 1220*c*, and 1220*d* based on at least one of the block shape information and the partition shape information. The video decoding apparatus 100 may obtain at least one of the block shape information and the partition shape information, and determine a plurality of various-shaped second coding units (e.g., 1210) by partitioning the first coding unit 1200, based on the obtained at least one of the block shape information and the partition shape information, and the second coding unit 1210 may be partitioned by using the partitioning method of the first coding unit 1200, based on at least one of the block shape information and the partition shape information. According to an embodiment, when the first coding unit 1200 is partitioned into the second coding units 1210 based on at least one of the block shape information and the partition shape information of the first coding unit 1200, the second coding unit 1210 may also be partitioned into the third coding units 1220*a*, or 1220*b*, 1220*c*, and 1220*d* based on at least one of the block shape information and the partition shape information of the second coding unit 1210. That is, a coding unit may be recursively partitioned based on at least one of the block shape information and the partition shape information of each coding unit. Therefore, a square coding unit may be determined by partitioning a non-square coding unit, and a non-square coding unit may be determined by recursively partitioning the square coding unit. Referring to FIG. 12, a predetermined coding unit from among an odd number of third coding units 1220*b*, 1220*c*, and 1220*d* determined by partitioning the non-square second coding unit 1210 (e.g., a coding unit at a center location or a square coding unit) may be recursively partitioned. According to an embodiment, the square third coding unit 1220*c* from among the odd number of third coding units 1220*b*, 1220*c*, and 1220*d* may be partitioned in a horizontal direction into a plurality of fourth coding units. A non-square fourth coding unit from among the plurality of fourth coding units may be partitioned into a plurality of coding units. For example, the non-square fourth coding unit 1240 may be partitioned into an odd number of coding units.

A method that may be used to recursively partition a coding unit will be described below in relation to various embodiments.

According to an embodiment, the video decoding apparatus 100 may determine to partition each of the third coding units 1220*a*, or 1220*b*, 1220*c*, and 1220*d* into coding units or not to partition the second coding unit 1210, based on at least one of the block shape information and the partition shape information.

According to an embodiment, the video decoding apparatus 100 may partition the non-square second coding unit 1210 into the odd number of third coding units 1220*b*, 1220*c*, and 1220*d*. The video decoding apparatus 100 may put a predetermined restriction on a predetermined third coding unit from among the odd number of third coding units 1220*b*, 1220*c*, and 1220*d*. For example, the video decoding apparatus 100 may restrict the third coding unit 1220*c* at a center location from among the odd number of third coding units 1220*b*, 1220*c*, and 1220*d* to be no longer partitioned or to be partitioned by a settable number of times. Referring to FIG. 12, the video decoding apparatus 100 may restrict the third coding unit 1220*c*, which is at the center location from among the odd number of third coding units 1220*b*, 1220*c*, and 1220*d* included in the non-square second coding unit 1210, to be no longer partitioned, to be partitioned by using a predetermined partitioning method (e.g., partitioned into only four coding units or partitioned by using a partitioning method of the second coding unit 1210), or to be partitioned by only a predetermined number of times (e.g., partitioned by only n times (where n>0)). However, the restrictions on the third coding unit 1220*c* at the center location are not limited to the above-described examples, and may include various restrictions for decoding the third coding unit 1220*c* at the center location differently from the other third coding units 1220*b* and 1220*d*.

According to an embodiment, the video decoding apparatus 100 may obtain at least one of the block shape information and the partition shape information, which is used to partition a current coding unit, from a predetermined location in the current coding unit.

Figure 13:
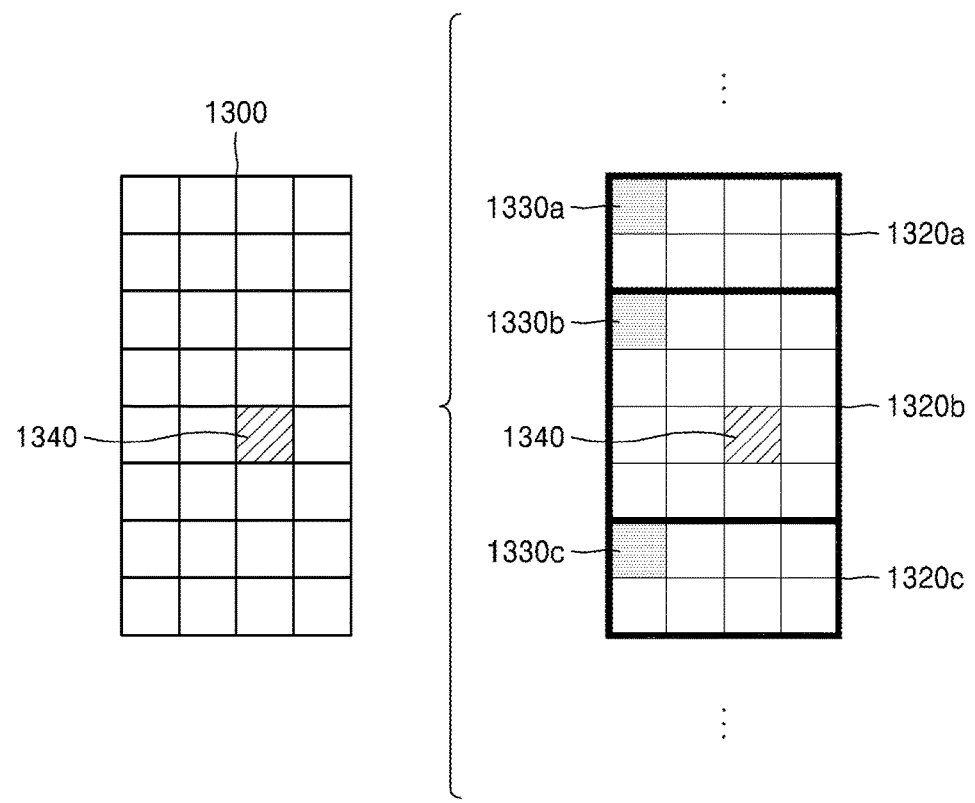
FIG. 13 illustrates a method of determining a predetermined coding unit from among an odd number of coding units, according to an embodiment.

FIG. 13 illustrates a method, performed by the video decoding apparatus 100, of determining a predetermined coding unit from among an odd number of coding units, according to an embodiment. Referring to FIG. 13, at least one of block shape information and partition shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the partition shape information may be obtained, is not limited to the center location in FIG. 13, and may include various locations included in the current coding unit 1300 (e.g., top, bottom, left, right, top left, bottom left, top right, and bottom right locations). The video decoding apparatus 100 may obtain at least one of the block shape information and the partition shape information from the predetermined location and determine to or not to partition the current coding unit into various-shaped and various-sized coding units.

According to an embodiment, when the current coding unit is partitioned into a predetermined number of coding units, the video decoding apparatus 100 may select one of the coding units. Various methods may be used to select one of a plurality of coding units, as will be described below in relation to various embodiments.

According to an embodiment, the video decoding apparatus 100 may partition the current coding unit into a plurality of coding units, and determine a coding unit at a predetermined location.

FIG. 13 illustrates a method, performed by the video decoding apparatus 100, of determining a coding unit of a predetermined location from among an odd number of coding units, according to an embodiment.

According to an embodiment, the video decoding apparatus 100 may use information indicating locations of the odd number of coding units, to determine a coding unit at a center location from among the odd number of coding units. Referring to FIG. 13, the video decoding apparatus 100 may determine an odd number of coding units 1320*a*, 1320*b*, and 1320*c* by partitioning the current coding unit 1300. The video decoding apparatus 100 may determine a coding unit 1320*b* at a center location by using information about locations of the odd number of coding units 1320*a* to 1320*c*. For example, the video decoding apparatus 100 may determine the coding unit 1320*b* of the center location by determining the locations of the coding units 1320*a*, 1320*b*, and 1320*c* based on information indicating locations of predetermined samples included in the coding units 1320*a*, 1320*b*, and 1320*c*. In more detail, the video decoding apparatus 100 may determine the coding unit 1320*b* at the center location by determining the locations of the coding units 1320*a*, 1320*b*, and 1320*c* based on information indicating locations of top left samples 1330*a*, 1330*b*, and 1330*c* of the coding units 1320*a*, 1320*b*, and 1320*c*.

According to an embodiment, the information indicating the locations of the top left samples 1330*a*, 1330*b*, and 1330*c*, which are included in the coding units 1320*a*, 1320*b*, and 1320*c*, respectively, may include information about locations or coordinates of the coding units 1320*a*, 1320*b*, and 1320*c* in a picture. According to an embodiment, the information indicating the locations of the top left samples 1330*a*, 1330*b*, and 1330*c*, which are included in the coding units 1320*a*, 1320*b*, and 1320*c*, respectively, may include information indicating widths or heights of the coding units 1320*a*, 1320*b*, and 1320*c* included in the current coding unit 1300, and the widths or heights may correspond to information indicating differences between the coordinates of the coding units 1320*a*, 1320*b*, and 1320*c* in the picture. That is, the video decoding apparatus 100 may determine the coding unit 1320*b* at the center location by directly using the information about the locations or coordinates of the coding units 1320*a*, 1320*b*, and 1320*c* in the picture, or by using the information about the widths or heights of the coding units, which correspond to the difference values between the coordinates.

According to an embodiment, information indicating the location of the top left sample 1330*a* of the upper coding unit 1320*a* may include a coordinate (xa, ya), information indicating the location of the top left sample 1330*b* of the middle coding unit 1320*b* may include a coordinate (xb, yb), and information indicating the location of the top left sample 1330*c* of the lower coding unit 1320*c* may include a coordinate (xc, yc). The video decoding apparatus 100 may determine the middle coding unit 1320*b* by using the coordinates of the top left samples 1330*a*, 1330*b*, and 1330*c* which are included in the coding units 1320*a*, 1320*b*, and 1320*c*, respectively. For example, when the coordinates of the top left samples 1330*a*, 1330*b*, and 1330*c* are sorted in an ascending or descending order, the coding unit 1320*b* including the coordinate (xb, yb) of the sample 1330*b* at a center location may be determined as a coding unit at a center location from among the coding units 1320*a*, 1320*b*, and 1320*c* determined by partitioning the current coding unit 1300. However, the coordinates indicating the locations of the top left samples 1330*a*, 1330*b*, and 1330*c* may include coordinates indicating absolute locations in the picture, or may use a coordinate (dxb, dyb) indicating a relative location of the top left sample 1330*b* of the middle coding unit 1320*b* and a coordinate (dxc, dyc) indicating a relative location of the top left sample 1330*c* of the lower coding unit 1320*c* with reference to the location of the top left sample 1330*a* of the upper coding unit 1320*a*. A method of determining a coding unit at a predetermined location by using a coordinate of a sample included in the coding unit, as information indicating a location of the sample, is not limited to the above-described method, and may include various arithmetic methods capable of using the coordinate of the sample.

According to an embodiment, the video decoding apparatus 100 may partition the current coding unit 1300 into a plurality of coding units 1320*a*, 1320*b*, and 1320*c*, and select one of the coding units 1320*a*, 1320*b*, and 1320*c* based on a predetermined criterion. For example, the video decoding apparatus 100 may select the coding unit 1320*b*, which has a size different from that of the others, from among the coding units 1320*a*, 1320*b*, and 1320*c*.

According to an embodiment, the video decoding apparatus 100 may determine the widths or heights of the coding units 1320*a*, 1320*b*, and 1320*c* by using the coordinate (xa, ya) indicating the location of the top left sample 1330*a* of the upper coding unit 1320*a*, the coordinate (xb, yb) indicating the location of the top left sample 1330*b* of the middle coding unit 1320*b*, and the coordinate (xc, yc) indicating the location of the top left sample 1330*c* of the lower coding unit 1320*c*. The video decoding apparatus 100 may determine the sizes of the coding units 1320*a*, 1320*b*, and 1320*c* by using the coordinates (xa, ya), (xb, yb), and (xc, yc) indicating the locations of the coding units 1320*a*, 1320*b*, and 1320*c*.

According to an embodiment, the video decoding apparatus 100 may determine the width of the upper coding unit 1320*a* to be xb-xa and determine the height thereof to be yb-ya. According to an embodiment, the video decoding apparatus 100 may determine the width of the middle coding unit 1320*b* to be xc-xb and determine the height thereof to be yc-yb. According to an embodiment, the video decoding apparatus 100 may determine the width or height of the lower coding unit 1320*c* by using the width or height of the current coding unit 1300 or the widths or heights of the upper and middle coding units 1320*a* and 1320*b*. The video decoding apparatus 100 may determine a coding unit, which has a size different from that of the others, based on the determined widths and heights of the coding units 1320*a* to 1320*c*. Referring to FIG. 13, the video decoding apparatus 100 may determine the middle coding unit 1320*b*, which has a size different from the size of the upper and lower coding units 1320*a* and 1320*c*, as the coding unit of the predetermined location. However, the above-described method, performed by the video decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the video decoding apparatus 100 may select a coding unit at a predetermined location from among an odd number of coding units determined by partitioning the current coding unit, considering the shape of the current coding unit. For example, when the current coding unit has a non-square shape, a width of which is longer than a height, the video decoding apparatus 100 may determine the coding unit at the predetermined location in a horizontal direction. That is, the video decoding apparatus 100 may determine one of coding units at different locations in a horizontal direction and put a restriction on the coding unit. When the current coding unit has a non-square shape, a height of which is longer than a width, the video decoding apparatus 100 may determine the coding unit at the predetermined location in a vertical direction. That is, the video decoding apparatus 100 may determine one of coding units at different locations in a vertical direction and put a restriction on the coding unit.

According to an embodiment, the video decoding apparatus 100 may use information indicating locations of an even number of coding units, to determine the coding unit at the predetermined location from among the even number of coding units. The video decoding apparatus 100 may determine an even number of coding units by partitioning the current coding unit, and determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof will not be provided herein.

According to an embodiment, when a non-square current coding unit is partitioned into a plurality of coding units, predetermined information about a coding unit at a predetermined location may be used in a partitioning operation to determine the coding unit at the predetermined location from among the plurality of coding units. For example, the video decoding apparatus 100 may use at least one of block shape information and partition shape information, which is stored in a sample included in a coding unit at a center location, in a partitioning operation to determine the coding unit at the center location from among the plurality of coding units determined by partitioning the current coding unit.

Referring to FIG. 13, the video decoding apparatus 100 may partition the current coding unit 1300 into a plurality of coding units 1320a, 1320b, and 1320c based on at least one of the block shape information and the partition shape information, and determine a coding unit 1320b at a center location from among the plurality of the coding units 1320a, 1320b, and 1320c. Furthermore, the video decoding apparatus 100 may determine the coding unit 1320b at the center location, in consideration of a location from which at least one of the block shape information and the partition shape information is obtained. That is, at least one of the block shape information and the partition shape information of the current coding unit 1300 may be obtained from the sample 1340 at a center location of the current coding unit 1300 and, when the current coding unit 1300 is partitioned into the plurality of coding units 1320a, 1320b, and 1320c based on at least one of the block shape information and the partition shape information, the coding unit 1320b including the sample 1340 may be determined as the coding unit at the center location. However, information used to determine the coding unit at the center location is not limited to at least one of the block shape information and the partition shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the video decoding apparatus 100 may use at least one of the block shape information and the partition shape information, which is obtained from a sample at a predetermined location in the current coding unit 1300 (e.g., a sample at a center location of the current coding unit 1300) to determine a coding unit at a predetermined location from among the plurality of the coding units 1320a, 1320b, and 1320c determined by partitioning the current coding unit 1300 (e.g., a coding unit at a center location from among a plurality of partitioned coding units). That is, the video decoding apparatus 100 may determine the sample at the predetermined location by considering a block shape of the current coding unit 1300, determine the coding unit 1320b including a sample, from which predetermined information (e.g., at least one of the block shape information and the partition shape information) may be obtained, from among the plurality of coding units 1320a, 1320b, and 1320c determined by partitioning the current coding unit 1300, and put a predetermined restriction on the coding unit 1320b. Referring to FIG. 13, according to an embodiment, the video decoding apparatus 100 may determine the sample 1340 at the center location of the current coding unit 1300 as the sample from which the predetermined information may be obtained, and put a predetermined restriction on the coding unit 1320b including the sample 1340, in a decoding operation. However, the location of the sample from which the predetermined information may be obtained is not limited to the above-described location, and may include arbitrary locations of samples included in the coding unit 1320b to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the video decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the video decoding apparatus 100 may determine one of samples adjacent to a boundary for dividing a long side of the current coding unit in half, as the sample from which the predetermined information may be obtained.

According to an embodiment, when the current coding unit is partitioned into a plurality of coding units, the video decoding apparatus 100 may use at least one of the block shape information and the partition shape information to determine a coding unit at a predetermined location from among the plurality of coding units. According to an embodiment, the video decoding apparatus 100 may obtain at least one of the block shape information and the partition shape information from a sample at a predetermined location in a coding unit, and partition the plurality of coding units, which are generated by partitioning the current coding unit, by using at least one of the partition shape information and the block shape information, which is obtained from the sample of the predetermined location in each of the plurality of coding units. That is, a coding unit may be recursively partitioned based on at least one of the block shape information and the partition shape information, which is obtained from the sample of the predetermined location in each coding unit. An operation of recursively partitioning a coding unit has been described above in relation to FIG. 12, and thus detailed descriptions thereof will not be provided herein.

According to an embodiment, the video decoding apparatus 100 may determine one or more coding units by partitioning the current coding unit, and determine an order of decoding the one or more coding units, based on a predetermined block (e.g., the current coding unit).

Figure 14:
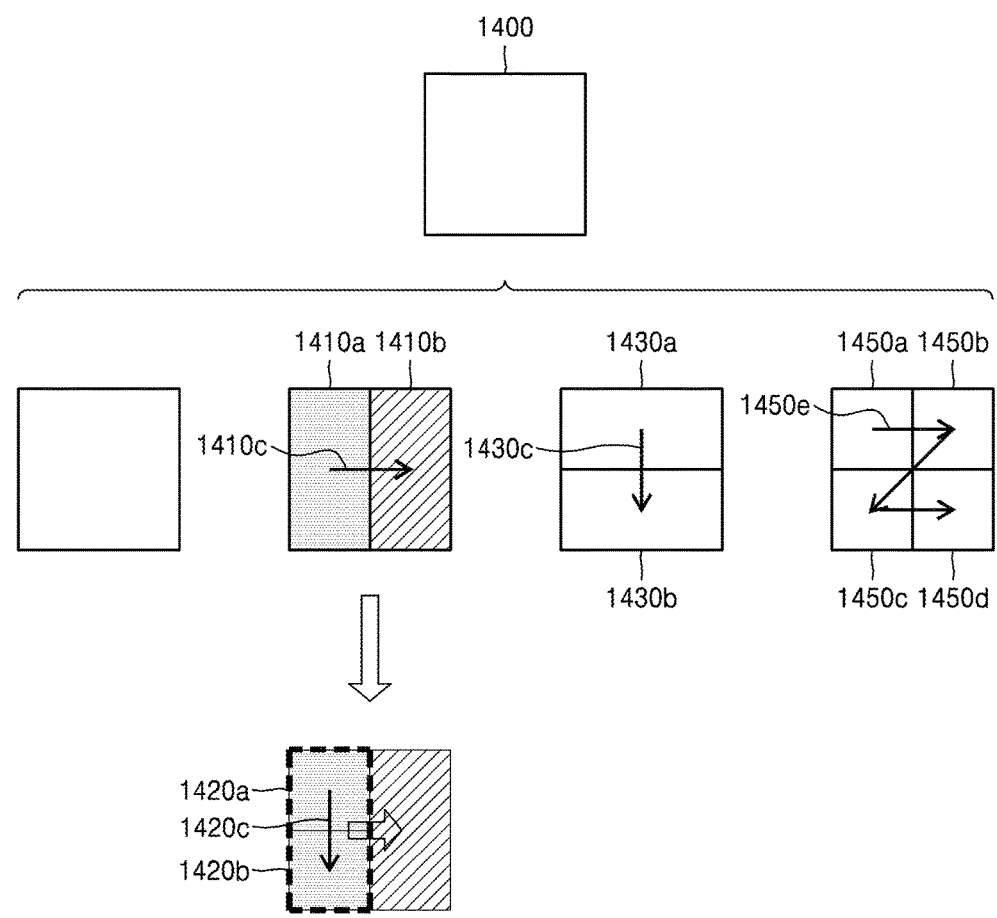
FIG. 14 illustrates a processing order of a plurality of coding units determined by partitioning a current coding unit, according to an embodiment.

FIG. 14 illustrates a processing order of a plurality of coding units when the video decoding apparatus 100 determines the plurality of coding units by partitioning a current coding unit, according to an embodiment.

According to an embodiment, the video decoding apparatus 100 may determine second coding units 1410a and 1410b by partitioning a first coding unit 1400 in a vertical direction, determine second coding units 1430a and 1430b by partitioning the first coding unit 1400 in a horizontal direction, or determine second coding units 1450a to 1450d by partitioning the first coding unit 1400 in vertical and horizontal directions, based on block shape information and partition shape information.

Referring to FIG. 14, the video decoding apparatus 100 may determine to process the second coding units 1410a and 1410b, which are determined by partitioning the first coding unit 1400 in a vertical direction, in a horizontal direction order 1410c. The video decoding apparatus 100 may determine to process the second coding units 1430a and 1430b, which are determined by partitioning the first coding unit 1400 in a horizontal direction, in a vertical direction order 1430c. The video decoding apparatus 100 may determine to process the second coding units 1450a to 1450d, which are determined by partitioning the first coding unit 1400 in vertical and horizontal directions, in a predetermined order for processing coding units in a row and then processing coding units in a next row (e.g., in a raster scan order or Z-scan order 1450e).

According to an embodiment, the video decoding apparatus 100 may recursively partition coding units. Referring to FIG. 14, the video decoding apparatus 100 may determine a plurality of coding units 1410a, 1410b, 1430a, 1430b, 1450a, 1450b, 1450c, and 1450d by partitioning the first coding unit 1400, and recursively partition each of the determined plurality of coding units 1410a, 1410b, 1430a, 1430b, 1450a, 1450b, 1450c, and 1450d. A partitioning method of the plurality of coding units 1410a, 1410b, 1430a, 1430b, 1450a, 1450b, 1450c, and 1450d may correspond to a partitioning method of the first coding unit 1400. As such, each of the plurality of coding units 1410a, 1410b, 1430a, 1430b, 1450a, 1450b, 1450c, and 1450d may be independently partitioned into a plurality of coding units. Referring to FIG. 14, the video decoding apparatus 100 may determine the second coding units 1410a and 1410b by partitioning the first coding unit 1400 in a vertical direction, and determine to independently partition or not to partition each of the second coding units 1410a and 1410b.

According to an embodiment, the video decoding apparatus 100 may determine third coding units 1420a and 1420b by partitioning the left second coding unit 1410a in a horizontal direction, and may not partition the right second coding unit 1410b.

According to an embodiment, a processing order of coding units may be determined based on an operation of partitioning a coding unit. In other words, a processing order of partitioned coding units may be determined based on a processing order of coding units immediately before being partitioned. The video decoding apparatus 100 may determine a processing order of the third coding units 1420a and 1420b determined by partitioning the left second coding unit 1410a, independently of the right second coding unit 1410b. Since the third coding units 1420a and 1420b are determined by partitioning the left second coding unit 1410a in a horizontal direction, the third coding units 1420a and 1420b may be processed in a vertical direction order 1420c. Since the left and right second coding units 1410a and 1410b are processed in the horizontal direction order 1410c, the right second coding unit 1410b may be processed after the third coding units 1420a and 1420b included in the left second coding unit 1410a are processed in the vertical direction order 1420c. An operation of determining a processing order of coding units based on a coding unit before being partitioned is not limited to the above-described example, and various methods may be used to independently process coding units, which are partitioned and determined to various shapes, in a predetermined order.

Figure 15:
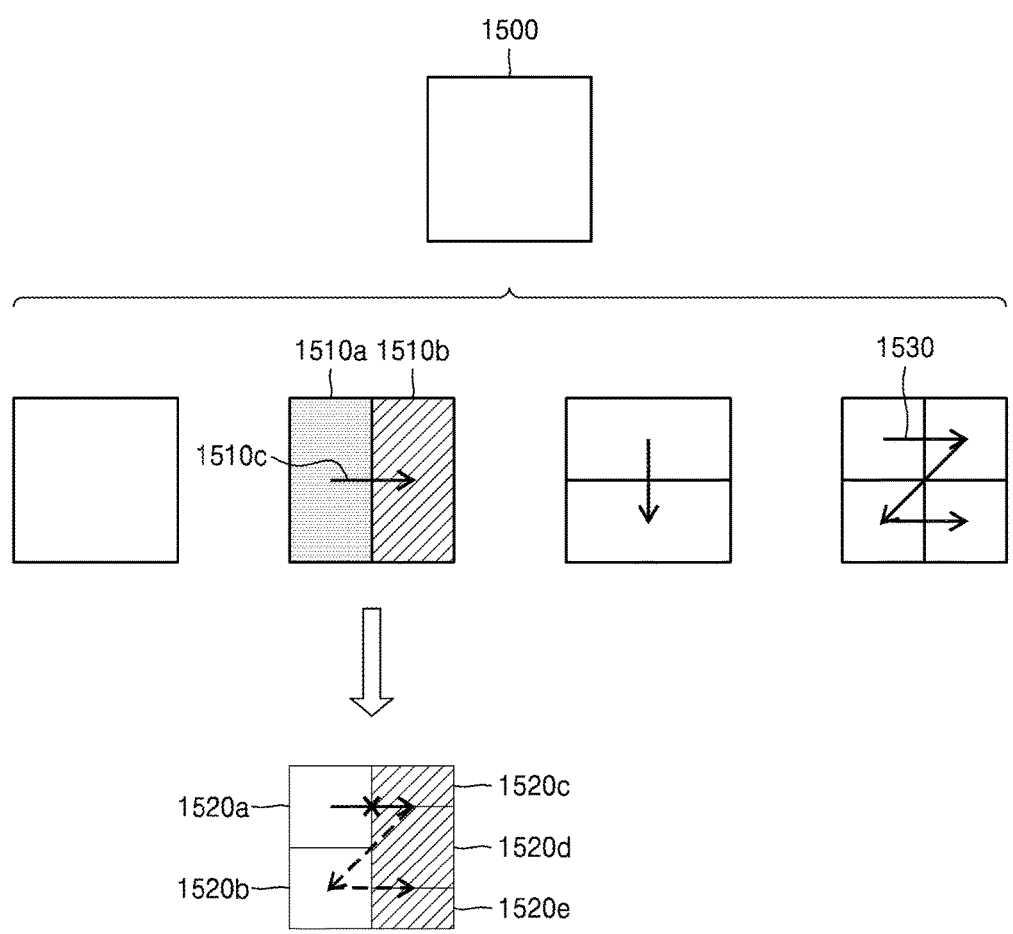
FIG. 15 illustrates an operation of determining that a current coding unit is partitioned into an odd number of coding units, when the coding units are not processable in a predetermined order, according to an embodiment.

FIG. 15 illustrates an operation, performed by the video decoding apparatus 100, of determining that a current coding unit is partitioned into an odd number of coding units, when the coding units are not processable in a predetermined order, according to an embodiment.

According to an embodiment, the video decoding apparatus 100 may determine whether the current coding unit is partitioned into an odd number of coding units, based on obtained block shape information and partition shape information. Referring to FIG. 15, a square first coding unit 1500 may be partitioned into non-square second coding units 1510a and 1510b, and the second coding units 1510a and 1510b may be independently partitioned into third coding units 1520a and 1520b, and 1520c to 1520e. According to an embodiment, the video decoding apparatus 100 may determine a plurality of third coding units 1520a and 1520b by partitioning the left second coding unit 1510a in a horizontal direction, and partition the right second coding unit 1510b into an odd number of third coding units 1520c to 1520e.

According to an embodiment, the video decoding apparatus 100 may determine whether any coding unit is partitioned into an odd number of coding units, by deciding whether the third coding units 1520a and 1520b, and 1520c to 1520e are processable in a predetermined order. Referring to FIG. 15, the video decoding apparatus 100 may determine the third coding units 1520a and 1520b, and 1520c to 1520e by recursively partitioning the first coding unit 1500. The video decoding apparatus 100 may determine whether any of the first coding unit 1500, the second coding units 1510a and 1510b, and the third coding units 1520a and 1520b, and 1520c to 1520e is partitioned into an odd number of coding units, based on at least one of the block shape information and the partition shape information. For example, the right second coding unit 1510b may be partitioned into an odd number of third coding units 1520c to 1520e. A processing order of a plurality of coding units included in the first coding unit 1500 may be a predetermined order (e.g., a Z-scan order 1530), and the video decoding apparatus 100 may decide whether the third coding units 1520c to 1520e, which are determined by partitioning the right second coding unit 1510b into an odd number of coding units, satisfy a condition for processing in the predetermined order.

According to an embodiment, the video decoding apparatus 100 may determine whether the third coding units 1520a and 1520b, and 1520c to 1520e included in the first coding unit 1500 satisfy the condition for processing in the predetermined order, and the condition relates to whether at least one of a width and height of the second coding units 1510a and 1510b is divided in half along a boundary of the third coding units 1520a and 1520b, and 1520c to 1520e. For example, the third coding units 1520a and 1520b determined by dividing the height of the non-square left second coding unit 1510a in half satisfy the condition. However, since boundaries of the third coding units 1520c to 1520e determined by partitioning the right second coding unit 1510b into three coding units do not divide the width or height of the right second coding unit 1510b in half, it may be determined that the third coding units 1520c to 1520e do not satisfy the condition. When the condition is not satisfied as described above, the video decoding apparatus 100 may decide disconnection of a scan order, and determine that the right second coding unit 1510b is partitioned into an odd number of coding units, based on the result of decision. According to an embodiment, when a coding unit is partitioned into an odd number of coding units, the video decoding apparatus 100 may put a predetermined restriction on a coding unit of a predetermined location among the partitioned coding units. The restriction or the predetermined location has been described above in relation to various embodiments, and thus a detailed description thereof will not be provided herein.

Figure 16:
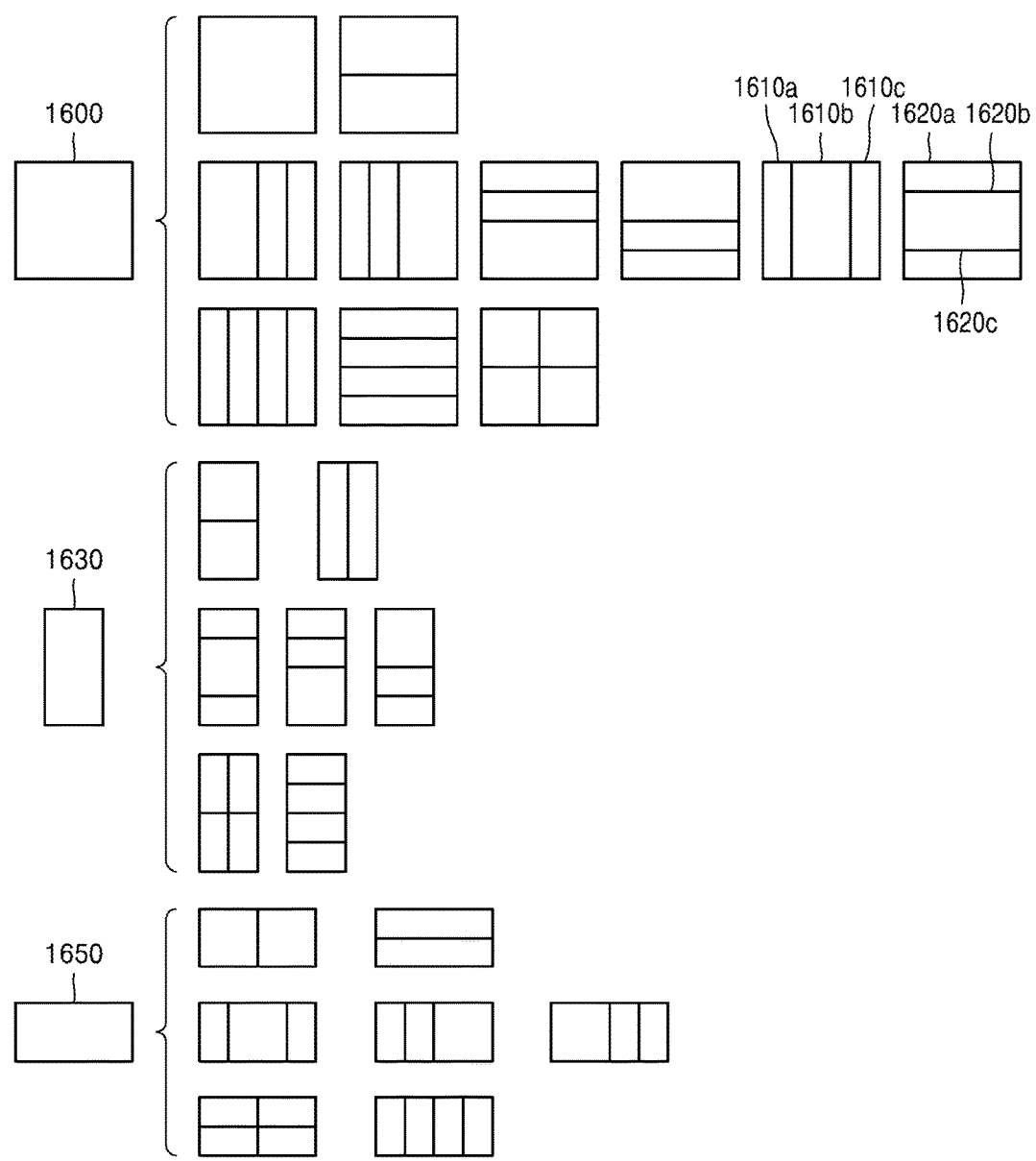
FIG. 16 illustrates an operation of determining one or more coding units by partitioning a first coding unit, according to an embodiment.

FIG. 16 illustrates an operation, performed by the video decoding apparatus 100, of determining one or more coding units by partitioning a first coding unit 1600, according to an embodiment. According to an embodiment, the video decoding apparatus 100 may partition the first coding unit 1600, based on at least one of block shape information and partition shape information, which is obtained by the information acquirer 120. The square first coding unit 1600 may be partitioned into four square coding units or into a plurality of non-square coding units. For example, referring to FIG. 16, when the block shape information indicates that the first coding unit 1600 has a square shape and the partition shape information indicates to partition the first coding unit 1600 into non-square coding units, the video decoding apparatus 100 may partition the first coding unit 1600 into a plurality of non-square coding units. In more detail, when the partition shape information indicates to determine an odd number of coding units by partitioning the first coding unit 1600 in a horizontal direction or a vertical direction, the video decoding apparatus 100 may partition the square first coding unit 1600 into an odd number of coding units, e.g., second coding units 1610a, 1610b, and 1610c determined by partitioning the square first coding unit 1600 in a vertical direction or second coding units 1620a, 1620b, and 1620c determined by partitioning the square first coding unit 1600 in a horizontal direction.

According to an embodiment, the video decoding apparatus 100 may determine whether the second coding units 1610a, 1610b, 1610c, 1620a, 1620b, and 1620c included in the first coding unit 1600 satisfy a condition for processing in a predetermined order, and the condition relates to whether at least one of a width and height of the first coding unit 1600 is divided in half along a boundary of the second coding units 1610a, 1610b, 1610c, 1620a, 1620b, and 1620c. Referring to FIG. 16, since boundaries of the second coding units 1610a, 1610b, and 1610c determined by partitioning the square first coding unit 1600 in a vertical direction do not divide the width of the first coding unit 1600 in half, it may be determined that the first coding unit 1600 does not satisfy the condition for processing in the predetermined order. In addition, since boundaries of the second coding units 1620a, 1620b, and 1620c determined by partitioning the square first coding unit 1600 in a horizontal direction do not divide the height of the first coding unit 1600 in half, it may be determined that the first coding unit 1600 does not satisfy the condition for processing in the predetermined order. When the condition is not satisfied as described above, the video decoding apparatus 100 may decide disconnection of a scan order, and determine that the first coding unit 1600 is partitioned into an odd number of coding units, based on the result of decision. According to an embodiment, when a coding unit is partitioned into an odd number of coding units, the video decoding apparatus 100 may put a predetermined restriction on a coding unit at a predetermined location from among the partitioned coding units. The restriction or the predetermined location has been described above in relation to various embodiments, and thus detailed descriptions thereof will not be provided herein.

According to an embodiment, the video decoding apparatus 100 may determine various-shaped coding units by partitioning a first coding unit.

Referring to FIG. 16, the video decoding apparatus 100 may partition the square first coding unit 1600 or a non-square first coding unit 1630 or 1650 into various-shaped coding units.

Figure 17:
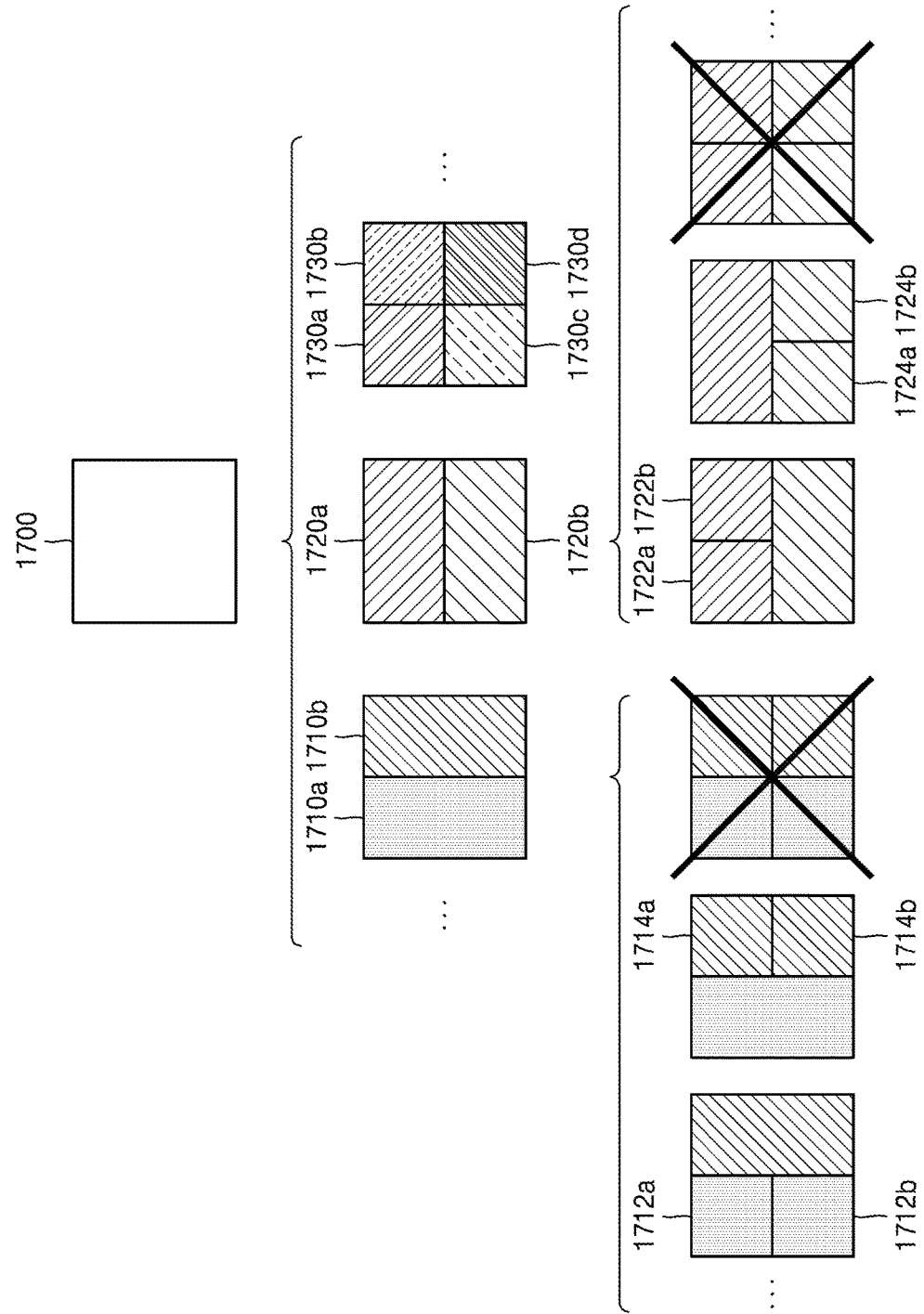
FIG. 17 illustrates that partitioning methods of determining non-square second coding units by partitioning a first coding unit are restricted when the second coding units satisfy a predetermined condition, according to an embodiment.

FIG. 17 illustrates that a shape into which a second coding unit is splittable by the video decoding apparatus 100 is restricted when the second coding unit having a non-square shape, which is determined by partitioning a first coding unit 1700, satisfies a predetermined condition, according to an embodiment.

According to an embodiment, the video decoding apparatus 100 may determine to partition the square first coding unit 1700 into non-square second coding units 1710a, 1710b, 1720a, and 1720b, based on at least one of block shape information and partition shape information, which is obtained by the information acquirer 120. The second coding units 1710a, 1710b, 1720a, and 1720b may be independently partitioned. As such, the video decoding apparatus 100 may determine to or not to partition the first coding unit 1700 into a plurality of coding units, based on at least one of the block shape information and the partition shape information of each of the second coding units 1710a, 1710b, 1720a, and 1720b. According to an embodiment, the video decoding apparatus 100 may determine third coding units 1712a and 1712b by partitioning the non-square left second coding unit 1710a, which is determined by partitioning the first coding unit 1700 in a vertical direction, in a horizontal direction. However, when the left second coding unit 1710a is partitioned in a horizontal direction, the video decoding apparatus 100 may restrict the right second coding unit 1710b not to be partitioned in a horizontal direction in which the left second coding unit 1710a is partitioned. When third coding units 1714a and 1714b are determined by also partitioning the right second coding unit 1710b in a horizontal direction, since the left and right second coding units 1710a and 1710b are independently partitioned in a horizontal direction, the third coding units 1712a, 1712b, 1714a, and 1714b may be determined. However, this case serves equally as a case in which the video decoding apparatus 100 partitions the first coding unit 1700 into four square second coding units 1730a, 1730b, 1730c, and 1730d, based on at least one of the block shape information and the partition shape information, and may be inefficient in terms of image decoding.

According to an embodiment, the video decoding apparatus 100 may determine third coding units 1722a, 1722b, 1724a, and 1724b by partitioning the non-square second coding unit 1720a or 1720b, which is determined by partitioning the first coding unit 1700 in a horizontal direction, in a vertical direction. However, when a second coding unit (e.g., the upper second coding unit 1720a) is partitioned in a vertical direction, due to the above-described reason, the video decoding apparatus 100 may restrict the other second coding unit (e.g., the lower second coding unit 1720b) not to be partitioned in a vertical direction in which the upper second coding unit 1720a is partitioned.

Figure 18:
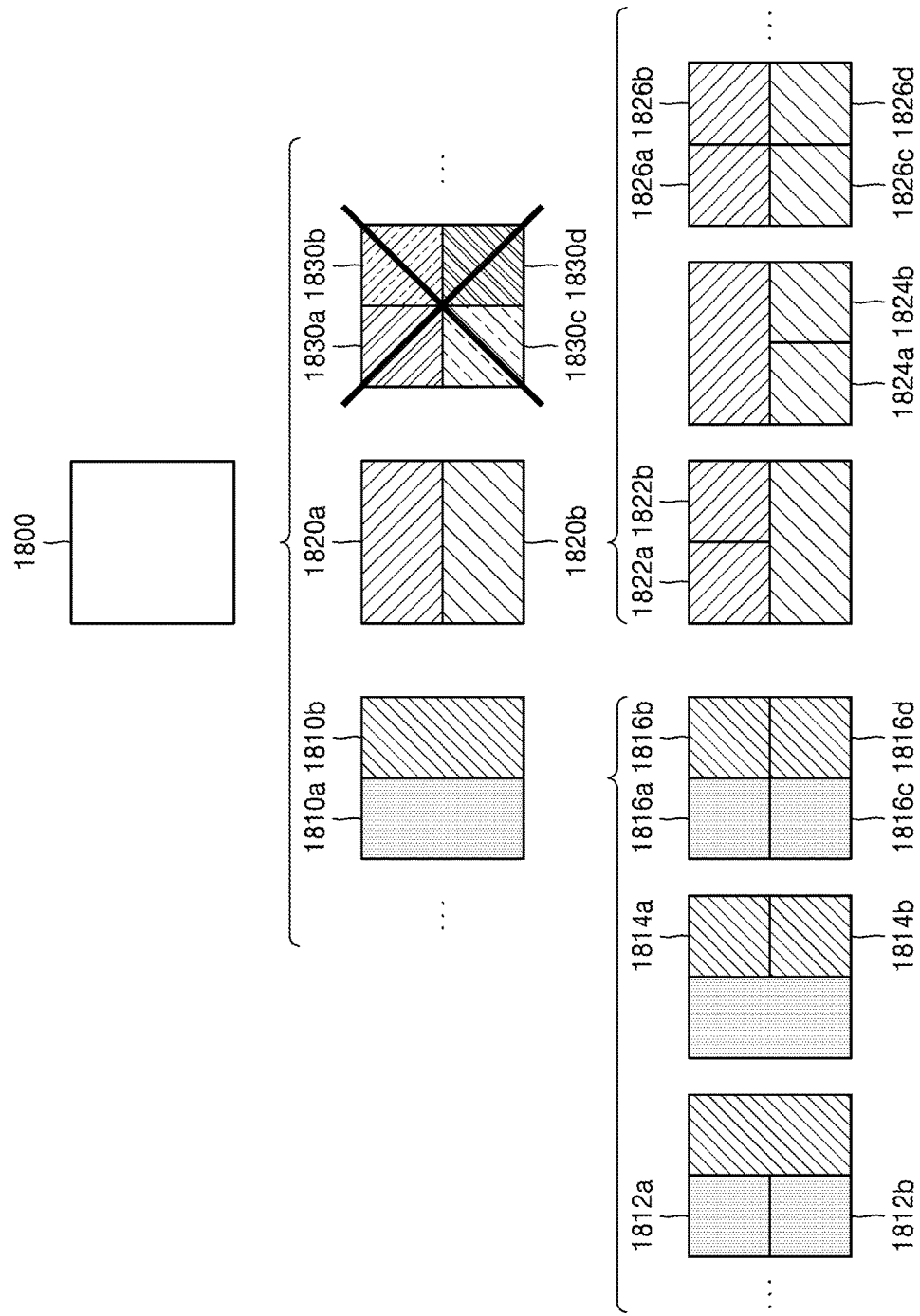
FIG. 18 illustrates an operation of partitioning a square coding unit when partition shape information indicates not to partition the square coding unit into four square coding units, according to an embodiment.

FIG. 18 illustrates an operation, performed by the video decoding apparatus 100, of partitioning a square coding unit when partition shape information indicates not to partition the square coding unit into four square coding units, according to an embodiment.

According to an embodiment, the video decoding apparatus 100 may determine second coding units 1810a, 1810b, 1820a, 1820b, etc. by partitioning a first coding unit 1800, based on at least one of block shape information and partition shape information. The partition shape information may include information about various methods of partitioning a coding unit but, the information about various partitioning methods may not include information for partitioning a coding unit into four square coding units. According to this partition shape information, the video decoding apparatus 100 may not partition the first square coding unit 1800 into four square second coding units 1830a, 1830b, 1830c, and 1830d. The video decoding apparatus 100 may determine the non-square second coding units 1810a, 1810b, 1820a, 1820b, etc., based on the partition shape information.

According to an embodiment, the video decoding apparatus 100 may independently partition the non-square second coding units 1810a, 1810b, 1820a, 1820b, etc. Each of the second coding units 1810a, 1810b, 1820a, 1820b, etc. may be recursively partitioned in a predetermined order, and this may correspond to a partitioning method of the first coding unit 1800, based on at least one of the block shape information and the partition shape information.

For example, the video decoding apparatus 100 may determine square third coding units 1812a and 1812b by partitioning the left second coding unit 1810a in a horizontal direction, and determine square third coding units 1814a and 1814b by partitioning the right second coding unit 1810b in a horizontal direction. Furthermore, the video decoding apparatus 100 may determine square third coding units 1816a to 1816d by partitioning both of the left and right second coding units 1810a and 1810b in a horizontal direction. In this case, coding units having the same shape as the four square second coding units 1830a, 1830b, 1830c, and 1830d partitioned from the first coding unit 1800 may be determined.

As another example, the video decoding apparatus 100 may determine square third coding units 1822a and 1822b by partitioning the upper second coding unit 1820a in a vertical direction, and determine square third coding units 1824a and 1824b by partitioning the lower second coding unit 1820b in a vertical direction. Furthermore, the video decoding apparatus 100 may determine square third coding units 1826a, 1826b, 1826c, and 1826d by partitioning both of the upper and lower second coding units 1820a and 1820b in a vertical direction. In this case, coding units having the same shape as the four square second coding units 1830a, 1830b, 1830c, and 1830d partitioned from the first coding unit 1800 may be determined.

Figure 19:
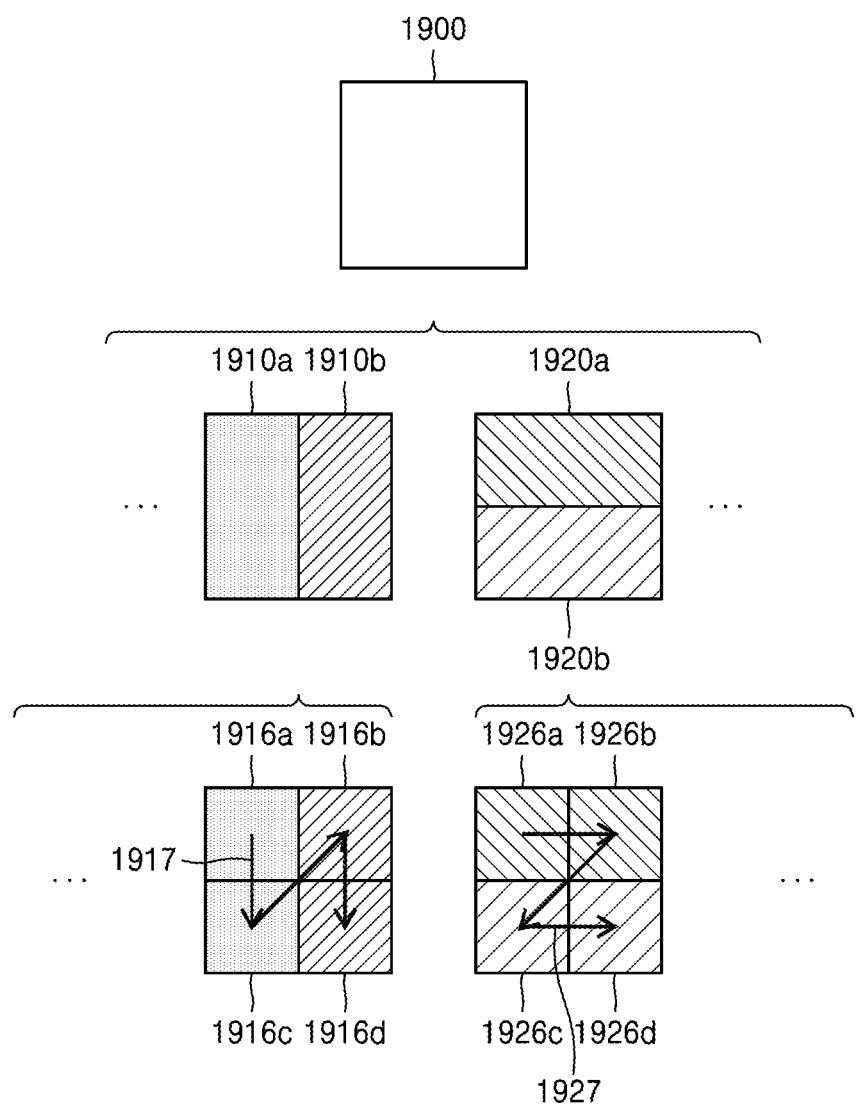
FIG. 19 illustrates that a processing order of a plurality of coding units is variable depending on an operation of partitioning a coding unit, according to an embodiment.

FIG. 19 illustrates that a processing order of a plurality of coding units is variable depending on an operation of partitioning a coding unit, according to an embodiment.

According to an embodiment, the video decoding apparatus 100 may partition a first coding unit 1900, based on block shape information and partition shape information. When the block shape information indicates a square shape and the partition shape information indicates to partition the first coding unit 1900 in at least one of horizontal and vertical directions, the video decoding apparatus 100 may determine second coding units 1910a, 1910b, 1920a, and 1920b by partitioning the first coding unit 1900. Referring to FIG. 19, the non-square second coding units 1910a, 1910b, 1920a, and 1920b determined by partitioning the first coding unit 1900 in only a horizontal direction or vertical direction may be independently partitioned based on the block shape information and the partition shape information of each coding unit. For example, the video decoding apparatus 100 may determine third coding units 1916a, 1916b, 1916c, and 1916d by partitioning the second coding units 1910a and 1910b, which are generated by partitioning the first coding unit 1900 in a vertical direction, in a horizontal direction, and determine third coding units 1926a, 1926b, 1926c, and 1926d by partitioning the second coding units 1920a and 1920b, which are generated by partitioning the first coding unit 1900 in a horizontal direction, in a vertical direction. An operation of partitioning the second coding units 1910a, 1910b, 1920a, and 1920b has been described above in relation to FIG. 17, and thus detailed descriptions thereof will not be provided herein.

According to an embodiment, the video decoding apparatus 100 may process coding units in a predetermined order. An operation of processing coding units in a predetermined order has been described above in relation to FIG. 14, and thus detailed descriptions thereof will not be provided herein. Referring to FIG. 19, the video decoding apparatus 100 may determine the four square third coding units 1916a, 1916b, 1916c, 1916d, 1926a, 1926b, 1926c, and 1926d by partitioning the square first coding unit 1900. According to an embodiment, the video decoding apparatus 100 may determine a processing order of the third coding units 1916a, 1916b, 1916c, 1916d, 1926a, 1926b, 1926c, and 1926d based on a partitioning method of the first coding unit 1900.

According to an embodiment, the video decoding apparatus 100 may determine the third coding units 1916a, 1916b, 1916c, and 1916d by partitioning the second coding units 1910a and 1910b generated by partitioning the first coding unit 1900 in a vertical direction, in a horizontal direction, and process the third coding units 1916a, 1916b, 1916c, and 1916d in a processing order 1917 for initially processing the third coding units 1916a and 1916c, which are included in the left second coding unit 1910a, in a vertical direction and then processing the third coding unit 1916b and 1916d, which are included in the right second coding unit 1910b, in a vertical direction.

According to an embodiment, the video decoding apparatus 100 may determine the third coding units 1926a, 1926b, 1926c, and 1926d by partitioning the second coding units 1920a and 1920b generated by partitioning the first coding unit 1900 in a horizontal direction, in a vertical direction, and process the third coding units 1926a, 1926b, 1926c, and 1926d in a processing order 1927 for initially processing the third coding units 1926a and 1926b, which are included in the upper second coding unit 1920a, in a horizontal direction and then processing the third coding unit 1926c and 1926d, which are included in the lower second coding unit 1920b, in a horizontal direction.

Referring to FIG. 19, the square third coding units 1916a, 1916b, 1916c, 1916d, 1926a, 1926b, 1926c, and 1926d may be determined by partitioning the second coding units 1910a, 1910b, 1920a, and 1920b. Although the second coding units 1910a and 1910b are determined by partitioning the first coding unit 1900 in a vertical direction differently from the second coding units 1920a and 1920b which are determined by partitioning the first coding unit 1900 in a horizontal direction, the third coding units 1916a, 1916b, 1916c, 1916d, 1926a, 1926b, 1926c, and 1926d partitioned therefrom eventually show same-shaped coding units partitioned from the first coding unit 1900. As such, by recursively partitioning a coding unit in different manners based on at least one of the block shape information and the partition shape information, the video decoding apparatus 100 may process a plurality of coding units in different orders even when the coding units are eventually determined to the same shape.

FIG. 20 illustrates an operation of determining a depth of a coding unit as the shape and size of the coding unit varies when a plurality of coding units are determined by recursively partitioning the coding unit, according to an embodiment.

According to an embodiment, the video decoding apparatus 100 may determine the depth of the coding unit based on a predetermined criterion. For example, the predetermined criterion may be the length of a long side of the coding unit. When the length of a long side of a coding unit before being partitioned is $2n$ times (n>0) the length of a long side of a partitioned current coding unit, the video decoding apparatus 100 may determine that a depth of the current coding unit is increased from a depth of the coding unit before being partitioned, by n. In the following description, a coding unit having an increased depth is expressed as a coding unit of a deeper depth.

Referring to FIG. 20, according to an embodiment, the video decoding apparatus 100 may determine a second coding unit 2002 and a third coding unit 2004 of deeper depths by partitioning a square first coding unit 2000 based on block shape information indicating a square shape (for example, the block shape information may be expressed as '0: SQUARE'). Assuming that the size of the square first coding unit 2000 is 2N×2N, the second coding unit 2002 determined by reducing a width and height of the first coding unit 2000 to ½¹ may have a size of N×N. Furthermore, the third coding unit 2004 determined by reducing a width and height of the second coding unit 2002 to ½ may have a size of N/2×N/2. In this case, a width and height of the third coding unit 2004 are ½² times those of the first coding unit 2000. When a depth of the first coding unit 2000 is D, a depth of the second coding unit 2002, the width and height of which are ½¹ times those of the first coding unit 2000, may be D+1, and a depth of the third coding unit 2004, the width and height of which are ½² times those of the first coding unit 2000, may be D+2.

According to an embodiment, the video decoding apparatus 100 may determine a second coding unit 2012 or 2022 and a third coding unit 2014 or 2024 of deeper depths by partitioning a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The video decoding apparatus 100 may determine a second coding unit 2002, 2012, or 2022 by dividing at least one of a width and height of the first coding unit 2010 having a size of N×2N. That is, the video decoding apparatus 100 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

According to an embodiment, the video decoding apparatus 100 may determine the second coding unit 2002, 2012, or 2022 by dividing at least one of a width and height of the first coding unit 2020 having a size of 2N×N. That is, the video decoding apparatus 100 may determine the second coding unit 2002 having a size of N×N or the second coding unit 2012 having a size of N/2×N by partitioning the first coding unit 2020 in a vertical direction, or determine the second coding unit 2022 having a size of N×N/2 by partitioning the first coding unit 2020 in horizontal and vertical directions.

According to an embodiment, the video decoding apparatus 100 may determine a third coding unit 2004, 2014, or 2024 by dividing at least one of a width and height of the second coding unit 2002 having a size of N×N. That is, the video decoding apparatus 100 may determine the third coding unit 2004 having a size of N/2×N/2, the third coding unit 2014 having a size of N/2²×N/2, or the third coding unit 2024 having a size of N/2×N/2² by partitioning the second coding unit 2002 in vertical and horizontal directions.

According to an embodiment, the video decoding apparatus 100 may determine the third coding unit 2004, 2014, or 2024 by dividing at least one of a width and height of the second coding unit 2012 having a size of N/2×N. That is, the video decoding apparatus 100 may determine the third coding unit 2004 having a size of N/2×N/2 or the third coding unit 2024 having a size of N/2×N/2² by partitioning the second coding unit 2012 in a horizontal direction, or determine the third coding unit 2014 having a size of N/2²×N/2 by partitioning the second coding unit 2012 in vertical and horizontal directions.

According to an embodiment, the video decoding apparatus 100 may determine the third coding unit 2004, 2014, or 2024 by dividing at least one of a width and height of the second coding unit 2022 having a size of N×N/2. That is, the video decoding apparatus 100 may determine the third coding unit 2004 having a size of N/2×N/2 or the third coding unit 2014 having a size of N/2²×N/2 by partitioning the second coding unit 2022 in a vertical direction, or determine the third coding unit 2024 having a size of N/2×N/2² by partitioning the second coding unit 2022 in vertical and horizontal directions.

According to an embodiment, the video decoding apparatus 100 may partition the square coding unit 2000, 2002, or 2004 in a horizontal or vertical direction. For example, the video decoding apparatus 100 may determine the first coding unit 2010 having a size of N×2N by partitioning the first coding unit 2000 having a size of 2N×2N in a vertical direction, or determine the first coding unit 2020 having a size of 2N×N by partitioning the first coding unit 2000 in a horizontal direction. According to an embodiment, when a depth is determined based on the length of the longest side of a coding unit, a depth of a coding unit determined by partitioning the first coding unit 2000 having a size of 2N×2N in a horizontal or vertical direction may be the same as the depth of the first coding unit 2000.

According to an embodiment, a width and height of the third coding unit 2014 or 2024 may be ½₂ times those of the first coding unit 2010 or 2020. When a depth of the first coding unit 2010 or 2020 is D, a depth of the second coding unit 2012 or 2022, the width and height of which are ½ times those of the first coding unit 2010 or 2020, may be D+1, and a depth of the third coding unit 2014 or 2024, the width and height of which are ½₂ times those of the first coding unit 2010 or 2020, may be D+2.

Figure 21:
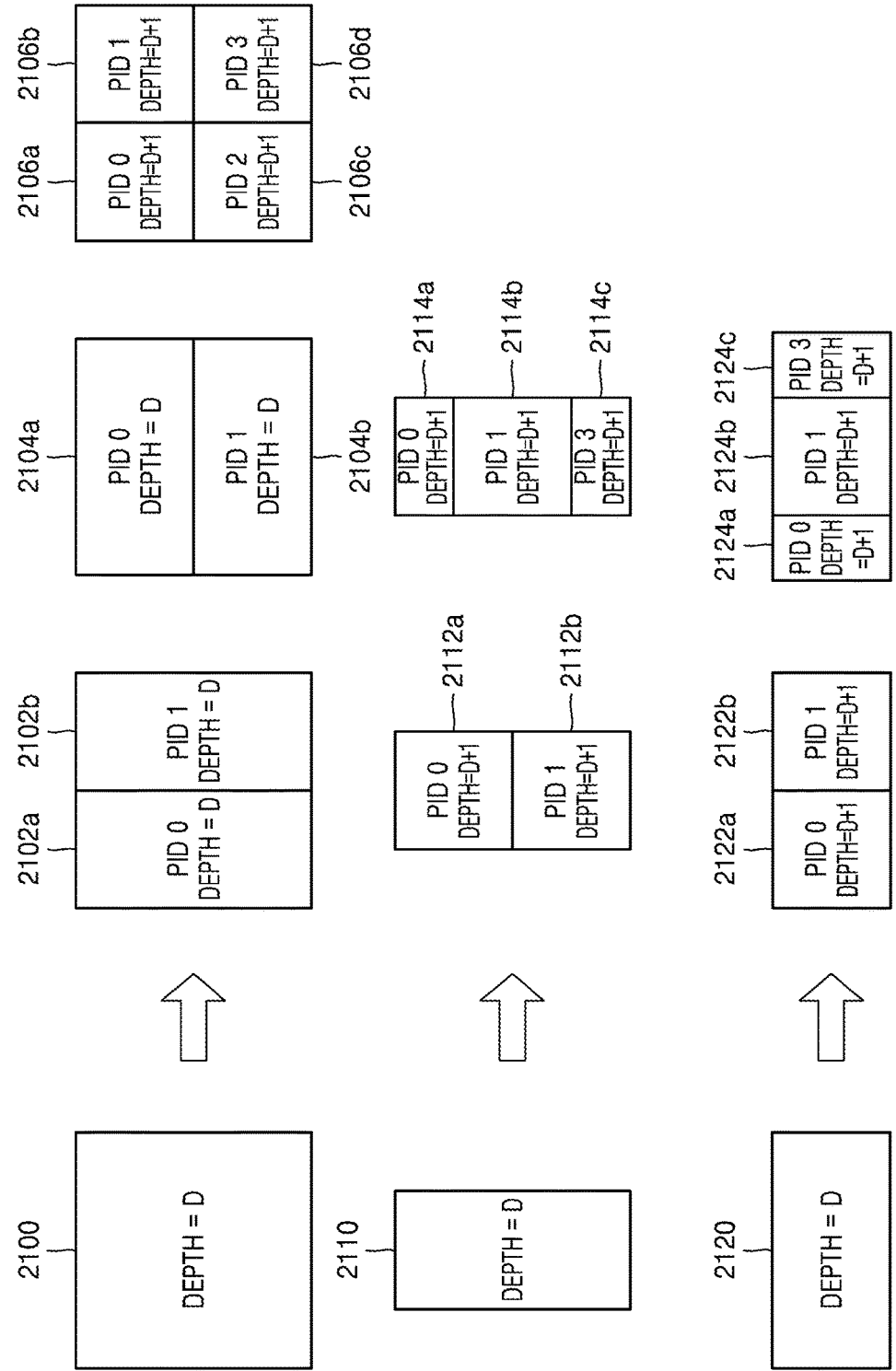
FIG. 21 illustrates depths of and part indices (PIDs) for distinguishing coding units, which are determinable based on the shapes and sizes of the coding units, according to an embodiment.

FIG. 21 illustrates depths of and part indices (PIDs) for distinguishing coding units, which may be determined based on the shapes and sizes of the coding units, according to an embodiment.

According to an embodiment, the video decoding apparatus 100 may determine various-shaped second coding units by partitioning a square first coding unit 2100. Referring to FIG. 21, the video decoding apparatus 100 may determine second coding units 2102a, 2102b, 2104a, 2104b, 2106a, 2106b, 2106c, and 2106d by partitioning the first coding unit 2100 in at least one of vertical and horizontal directions based on partition shape information. That is, the video decoding apparatus 100 may determine the second coding units 2102a, 2102b, 2104a, 2104b, 2106a, 2106b, 2106c, and 2106d based on the partition shape information of the first coding unit 2100.

According to an embodiment, a depth of the second coding units 2102a, 2102b, 2104a, 2104b, 2106a, 2106b, 2106c, and 2106d, which are determined based on the partition shape information of the square first coding unit 2100, may be determined based on the length of a long side thereof. For example, since the length of a side of the square first coding unit 2100 equals the length of a long side of the non-square second coding units 2102a, 2102b, 2104a, and 2104b, the first coding unit 2100 and the non-square second coding units 2102a, 2102b, 2104a, and 2104b may have the same depth, e.g., D. However, when the video decoding apparatus 100 partitions the first coding unit 2100 into the four square second coding units 2106a, 2106b, 2106c, and 2106d based on the partition shape information, since the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the video decoding apparatus 100 may determine a plurality of second coding units 2112a, 2112b, 2114a, 2114b, and 2114c by partitioning a first coding unit 2110, a height of which is longer than a width, in a horizontal direction based on the partition shape information. According to an embodiment, the video decoding apparatus 100 may determine a plurality of second coding units 2122a, 2122b, 2124a, 2124b, and 2124c by partitioning a first coding unit 2120, a width of which is longer than a height, in a vertical direction based on the partition shape information.

According to an embodiment, a depth of the second coding units 2112a, 2112b, 2114a, 2114b, 2114c, 2122a, 2122b, 2124a, 2124b, and 2124c, which are determined based on the partition shape information of the non-square first coding unit 2110 or 2120, may be determined based on the length of a long side thereof. For example, since the length of a side of the square second coding units 2112a and 2112b is ½ times the length of a long side of the first coding unit 2110 having a non-square shape, a height of which is longer than a width, a depth of the square second coding units 2112a and 2112b is D+1 which is deeper than the depth D of the non-square first coding unit 2110 by 1.

Furthermore, the video decoding apparatus 100 may partition the non-square first coding unit 2110 into an odd number of second coding units 2114a, 2114b, and 2114c based on the partition shape information. The odd number of second coding units 2114a, 2114b, and 2114c may include the non-square second coding units 2114a and 2114c and the square second coding unit 2114b. In this case, since the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The video decoding apparatus 100 may determine depths of coding units partitioned from the first coding unit 2120 having a non-square shape, a width of which is longer than a height, by using the above-described method of determining depths of coding units partitioned from the first coding unit 2110.

According to an embodiment, the video decoding apparatus 100 may determine PIDs for identifying partitioned coding units, based on a size ratio between the coding units when an odd number of partitioned coding units do not have equal sizes. Referring to FIG. 21, a coding unit 2114b of a center location among an odd number of partitioned coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, assuming that a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the video decoding apparatus 100 may determine whether an odd number of partitioned coding units do not have equal sizes, based on whether discontinuity is present in PIDs for identifying the partitioned coding units.

According to an embodiment, the video decoding apparatus 100 may determine whether to use a specific partitioning method, based on PID values for identifying a plurality of coding units determined by partitioning a current coding unit. Referring to FIG. 21, the video decoding apparatus 100 may determine an even number of coding units 2112a and 2112b or an odd number of coding units 2114a, 2114b, and 2114c by partitioning the first coding unit 2110 having a rectangular shape, a height of which is longer than a width. The video decoding apparatus 100 may use PIDs to identify a plurality of coding units. According to an embodiment, the PID may be obtained from a sample of a predetermined location of each coding unit (e.g., a top left sample).

According to an embodiment, the video decoding apparatus 100 may determine a coding unit at a predetermined location from among the partitioned coding units, by using the PIDs for distinguishing the coding units. According to an embodiment, when the partition shape information of the first coding unit 2110 having a rectangular shape, a height of which is longer than a width, indicates to partition a coding unit into three coding units, the video decoding apparatus 100 may partition the first coding unit 2110 into three coding units 2114a, 2114b, and 2114c. The video decoding apparatus 100 may assign a PID to each of the three coding units 2114a, 2114b, and 2114c. The video decoding apparatus 100 may compare PIDs of an odd number of partitioned coding units to determine a coding unit at a center location from among the coding units. The video decoding apparatus 100 may determine the coding unit 2114b having a PID corresponding to a middle value among the PIDs of the coding units, as the coding unit at the center location from among the coding units determined by partitioning the first coding unit 2110. According to an embodiment, the video decoding apparatus 100 may determine PIDs for distinguishing partitioned coding units, based on a size ratio between the coding units when the partitioned coding units do not have equal sizes. Referring to FIG. 21, the coding unit 2114b generated by partitioning the first coding unit 2110 may have a width equal to that of the other coding units 2114a and 2114c and a height which is two times that of the other coding units 2114a and 2114c. In this case, assuming that the PID of the coding unit 2114b at the center location is 1, the PID of the coding unit 2114c located next to the coding unit 2114b may be increased by 2 and thus may be 3. When the PID is not uniformly increased as described above, the video decoding apparatus 100 may determine that a coding unit is partitioned into a plurality of coding units including a coding unit having a size different from that of the other coding units. According to an embodiment, when the partition shape information indicates to partition a coding unit into an odd number of coding units, the video decoding apparatus 100 may partition a current coding unit in such a manner that a coding unit of a predetermined location among an odd number of coding units (e.g., a coding unit of a centre location) has a size different from that of the other coding units. In this case, the video decoding apparatus 100, may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the video decoding apparatus 100 may use a predetermined data unit where a coding unit starts to be recursively partitioned.

Figure 22:
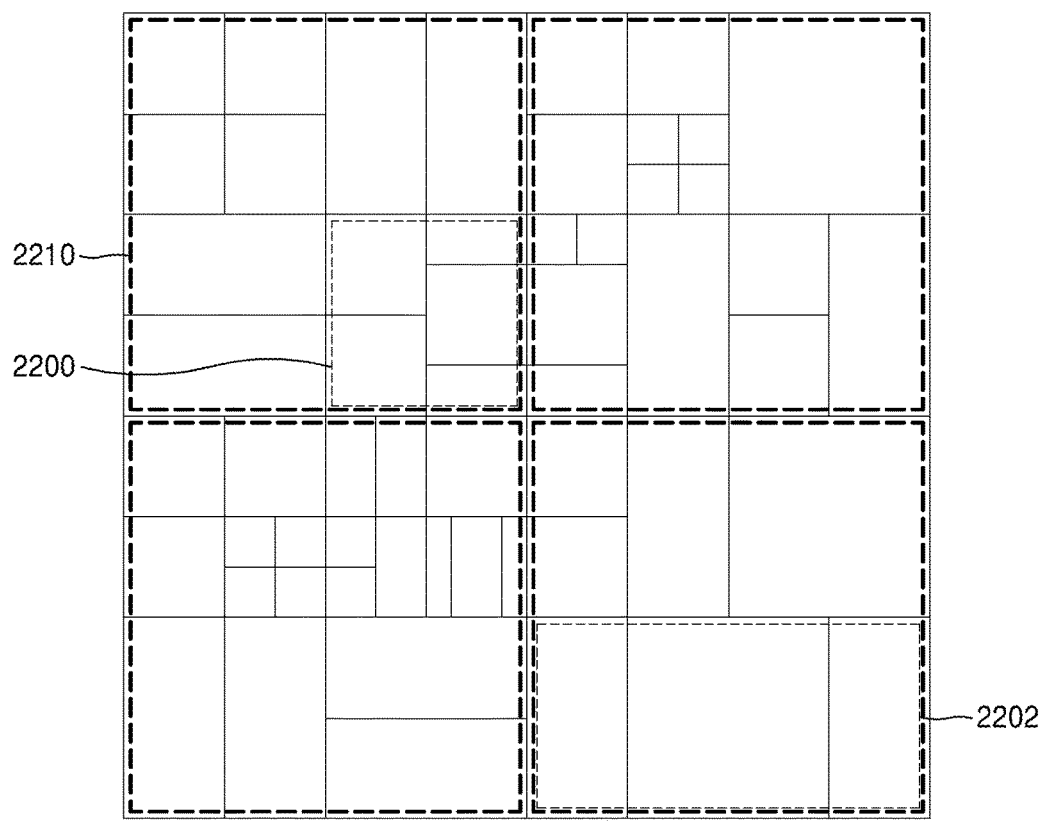
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively partitioned by using at least one of block shape information and partition shape information. That is, the predetermined data unit may correspond to a coding unit of an uppermost depth, which is used to determine a plurality of coding units partitioned from a current picture. In the following description, for convenience of explanation, the predetermined data unit is referred to as a reference data unit.

According to an embodiment, the reference data unit may have a predetermined size and shape. According to an embodiment, a reference coding unit may include M×N samples. Herein, M and N may be equal values, and may be integers expressed as multipliers of 2. That is, the reference data unit may have a square or non-square shape, and may be an integer number of coding units.

According to an embodiment, the video decoding apparatus 100 may partition the current picture into a plurality of reference data units. According to an embodiment, the video decoding apparatus 100 may partition the plurality of reference data units, which are partitioned from the current picture, by using partitioning information of each reference data unit. The operation of partitioning the reference data unit may correspond to a partitioning operation using a quadtree structure.

According to an embodiment, the video decoding apparatus 100 may previously determine the minimum size allowed for the reference data units included in the current picture. As such, the video decoding apparatus 100 may determine various reference data units having sizes equal to or greater than the minimum size, and determine one or more coding units by using the block shape information and the partition shape information with reference to the determined reference data unit.

Referring to FIG. 22, the video decoding apparatus 100 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, and largest coding units).

According to an embodiment, the information acquirer 120 of the video decoding apparatus 100 may obtain, from a bitstream, at least one of reference coding unit shape information and reference coding unit size information with respect to each of the various data units. An operation of partitioning the square reference coding unit 2200 into one or more coding units has been described above in relation to the operation of partitioning the current coding unit 1000 of FIG. 10, and an operation of partitioning the non-square reference coding unit 2202 into one or more coding units has been described above in relation to the operation of partitioning the current coding unit 1100 or 1150 of FIG. 11. Thus, detailed descriptions thereof will not be provided herein.

According to an embodiment, the video decoding apparatus 100 may use a PID for identifying the size and shape of reference coding units, to determine the size and shape of reference coding units according to some data units previously determined based on a predetermined condition. That is, the information acquirer 120 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, and largest coding units). The video decoding apparatus 100 may determine the size and shape of reference data units with respect to each data unit, which satisfies the predetermined condition, by using the PID. When the reference coding unit shape information and the reference coding unit size information are obtained and used from the bitstream with respect to each data unit having a relatively small size, since efficiency of using the bitstream may not be good, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the video decoding apparatus 100 may determine at least one of the size and shape of reference coding units included in a data unit serving as a unit for obtaining the PID, by selecting the previously determined at least one of the size and shape of reference coding units based on the PID.

According to an embodiment, the video decoding apparatus 100 may use one or more reference coding units included in a largest coding unit. That is, a largest coding unit partitioned from a picture may include one or more reference coding units, and coding units may be determined by recursively partitioning each reference coding unit.

According to an embodiment, at least one of a width and height of the largest coding unit may be integer times at least one of the width and height of the reference coding units. According to an embodiment, the size of reference coding units may be obtained by partitioning the largest coding unit n times based on a quadtree structure. That is, the video decoding apparatus 100 may determine the reference coding units by partitioning the largest coding unit n times based on a quadtree structure, and partition the reference coding unit based on at least one of the block shape information and the partition shape information according to various embodiments.

Figure 23:
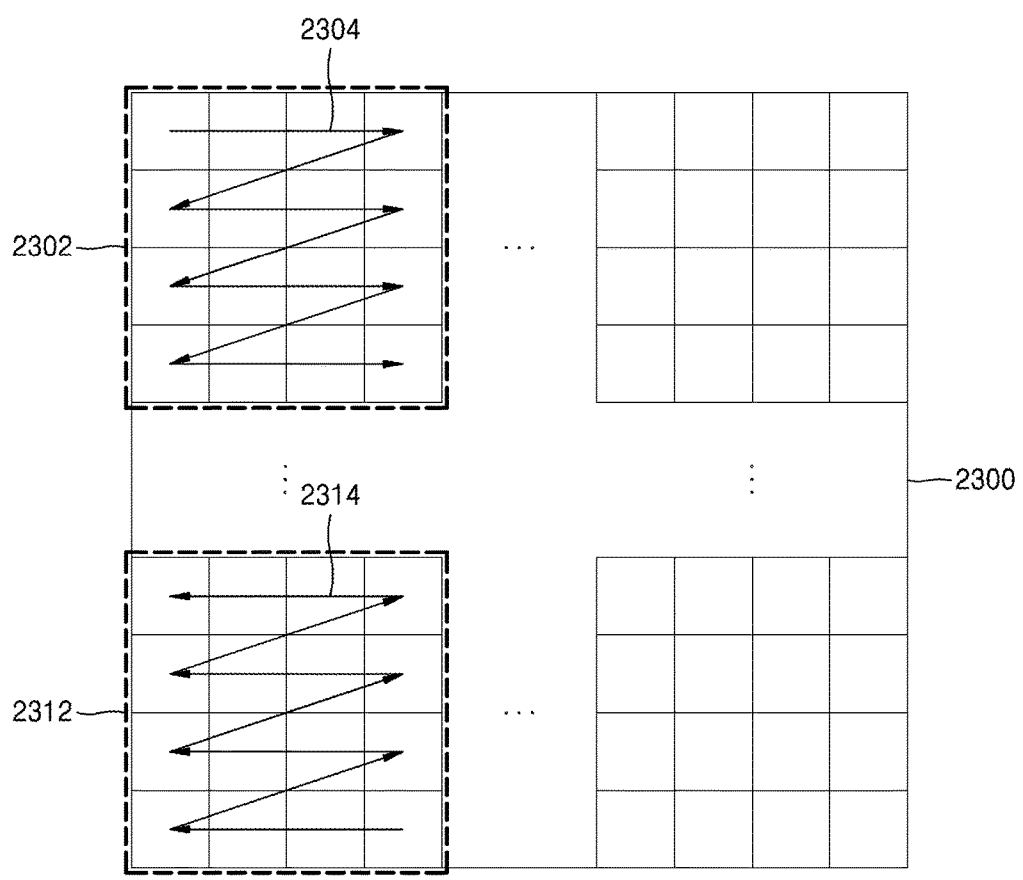
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the video decoding apparatus 100 may determine one or more processing blocks partitioned from a picture. The processing block is a data unit including one or more reference coding units partitioned from a picture, and the one or more reference coding units included in the processing block may be determined in a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the video decoding apparatus 100 may obtain processing block size information and determine the size of one or more processing blocks included in the picture. The video decoding apparatus 100 may obtain the processing block size information from a bitstream and determine the size of one or more processing blocks included in the picture. The size of processing blocks may be a predetermined size of data units, which is indicated by the processing block size information.

According to an embodiment, the information acquirer 120 of the video decoding apparatus 100 may obtain the processing block size information from the bitstream with respect to each specific data unit. For example, the processing block size information may be obtained from the bitstream in a data unit such as image, sequence, picture, slice, or slice segment. That is, the information acquirer 120 may obtain the processing block size information from the bitstream with respect to each of the various data units, and the video decoding apparatus 100 may determine the size of one or more processing blocks, which are partitioned from the picture, by using the obtained processing block size information. The size of processing blocks may be integer times that of the reference coding units.

According to an embodiment, the video decoding apparatus 100 may determine the size of processing blocks 2302 and 2312 included in the picture 2300. For example, the video decoding apparatus 100 may determine the size of processing blocks based on the processing block size information obtained from the bitstream. Referring to FIG. 23, according to an embodiment, the video decoding apparatus 100 may determine a width of the processing blocks 2302 and 2312 to be four times the width of the reference coding units, and determine a height of the processing blocks 2302 and 2312 to be four times the height of the reference coding units. The video decoding apparatus 100 may determine a determination order of one or more reference coding units in one or more processing blocks.

According to an embodiment, the video decoding apparatus 100 may determine the processing blocks 2302 and 2312, which are included in the picture 2300, based on the size of processing blocks, and determine a determination order of one or more reference coding units in the processing blocks 2302 and 2312. According to an embodiment, determination of reference coding units may include determination of the size of reference coding units.

According to an embodiment, the video decoding apparatus 100 may obtain, from the bitstream, determination order information of one or more reference coding units included in one or more processing blocks, and determine a determination order to one or more reference coding units based on the obtained determination order information. The determination order information may be defined as an order or direction for determining the reference coding units in the processing block. That is, the determination order of reference coding units may be independently determined with respect to each processing block.

According to an embodiment, the video decoding apparatus 100 may obtain the determination order information of reference coding units from the bitstream with respect to each specific data unit. For example, the information acquirer 120 may obtain the determination order information of reference coding units from the bitstream with respect to each data unit such as image, sequence, picture, slice, slice segment, or processing block. Since the determination order information of reference coding units indicates an order for determining reference coding units in a processing block, the determination order information may be obtained with respect to each specific data unit including an integer number of processing blocks.

According to an embodiment, the video decoding apparatus 100 may determine one or more reference coding units based on the determined determination order.

According to an embodiment, the information acquirer 120 may obtain the determination order information of reference coding units from the bitstream as information related to the processing blocks 2302 and 2312, and the video decoding apparatus 100 may determine a determination order of one or more reference coding units included in the processing blocks 2302 and 2312 and determine one or more reference coding units, which are included in the picture 2300, based on the determination order. Referring to FIG. 23, the video decoding apparatus 100 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included the processing block 2302 may be determined in a raster scan order. Unlike this, when the determination order 2314 of reference coding units in the other processing block 2312 is an inverse raster scan order, reference coding units included in the processing block 2312 may be determined in an inverse raster scan order.

According to an embodiment, the video decoding apparatus 100 may decode the determined one or more reference coding units. The video decoding apparatus 100 may decode the picture based on the reference coding units determined as described above. A method of decoding the reference coding units may include various image decoding methods.

According to an embodiment, the video decoding apparatus 100 may obtain block shape information indicating the shape of a current coding unit or partition shape information indicating a partitioning method of the current coding unit, from the bitstream, and use the obtained information. The block shape information or the partition shape information may be included in the bitstream related to various data units. For example, the video decoding apparatus 100 may use the block shape information or the partition shape information included in a sequence parameter set, a picture parameter set, a video parameter set, a slice header, or a slice segment header. Furthermore, the video decoding apparatus 100 may obtain syntax corresponding to the block shape information or the partition shape information from the bitstream with respect to each largest coding unit, reference coding unit, or processing block, and use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. A video decoding method comprising:
   determining neighboring pixels of a current block to be used for performing intra prediction on the current block;
   acquiring, from a bitstream, information indicating one of a plurality of filtering methods used on the neighboring pixels;
   selecting one of the plurality of filtering methods according to the acquired information;
   filtering the neighboring pixels by using the selected filtering method; and
   performing the intra prediction on the current block by using the filtered neighboring pixels,
   wherein the plurality of filtering methods comprise a spatial domain filtering method and a frequency domain filtering method, wherein the spatial domain filtering method filters the neighboring pixels in a spatial domain, and the frequency domain filtering method filters the neighboring pixels in a frequency domain.

2. The video decoding method of claim 1, wherein the spatial domain filtering method comprises:
   partitioning the neighboring pixels into predetermined pixel units;
   obtaining an average value of pixel values with respect to each of the predetermined pixel units; and
   substituting the average value for a pixel value of pixels included in each of the predetermined pixel units.

3. The video decoding method of claim 2, wherein the partitioning of the neighboring pixels into the predetermined pixel units comprises partitioning the neighboring pixels into the predetermined pixel units, based on image characteristics of the neighboring pixels.

4. The video decoding method of claim 2, wherein the partitioning of the neighboring pixels into the predetermined pixel units comprises:
   generating a histogram with respect to a pixel value of the neighboring pixels;
   setting sections of a pixel value in the histogram, based on at least one threshold value; and
   determining, as one pixel unit, pixels adjacent to each other and having a pixel value belonging to the same section of the histogram.

5. The video decoding method of claim 2, wherein the partitioning of the neighboring pixels into the predetermined pixel units comprises:
   generating a gradient value of the neighboring pixels by performing a gradient operation on the neighboring pixels; and
   determining a boundary between the predetermined pixel units by using one or more of the neighboring pixels having a gradient value greater than or equal to a threshold value.

6. The video decoding method of claim 2, wherein the partitioning of the neighboring pixels into the predetermined pixel units comprises:
   extracting edge information included in the neighboring pixels; and
   partitioning the neighboring pixels into the predetermined pixel units, based on the extracted edge information.

7. The video decoding method of claim 2, wherein the spatial domain filtering method further comprises filtering a boundary between the predetermined pixel units.

8. The video decoding method of claim 1, wherein the frequency domain filtering method comprises:
   transforming the neighboring pixels into the frequency domain;
   filtering the transformed neighboring pixels; and
   inverse-transforming the filtered neighboring pixels into the spatial domain.

9. The video decoding method of claim 8, wherein the filtering of the transformed neighboring pixels comprises filtering the transformed neighboring pixels by using a low-pass filter.

10. The video decoding method of claim 1, wherein
    the spatial domain filtering method and the frequency domain filtering method filter a block including the neighboring pixels, and
    a region corresponding to the neighboring pixels in the filtered block is used for performing the intra prediction on the current block.

11. A video decoding apparatus comprising:
    a neighboring pixel determiner configured to determine neighboring pixels of a current block to be used for performing intra prediction on the current block;
    an information acquirer configured to acquire, from a bitstream, information indicating one of a plurality of filtering methods used on the neighboring pixels; and
    a decoder configured to select one of the plurality of filtering methods according to the acquired information, filter the neighboring pixels by using the selected filtering method, and perform the intra prediction on the current block by using the filtered neighboring pixels, wherein the plurality of filtering methods comprise a spatial domain filtering method and a frequency domain filtering method, wherein the spatial domain filtering method filters the neighboring pixels in a spatial domain, and the frequency domain filtering method filters the neighboring pixels in a frequency domain.

12. The video decoding apparatus of claim 11, wherein the spatial domain filtering method comprises:

partitioning the neighboring pixels into predetermined pixel units;

obtaining an average value of pixel values with respect to each of the predetermined pixel units; and substituting the average value for a pixel value of pixels included in each of the predetermined pixel units.

13. The video decoding apparatus of claim 11, wherein the frequency domain filtering method comprises:

transforming the neighboring pixels into the frequency domain;

filtering the transformed neighboring pixels; and inverse-transforming the filtered neighboring pixels into the spatial domain.

14. A video encoding method comprising:

determining neighboring pixels of a current block to be used for performing intra prediction on the current block;

selecting one of a plurality of filtering methods used for the neighboring pixels;

filtering the neighboring pixels by using the selected filtering method; and performing the intra prediction on the current block by using the filtered neighboring pixels, wherein the plurality of filtering methods comprise a spatial domain filtering method and a frequency domain filtering method, wherein the spatial domain filtering method filters the neighboring pixels in a spatial domain, and the frequency domain filtering method filters the neighboring pixels in a frequency domain.

15. The video encoding method of claim 14, wherein the selecting comprises:

filtering the neighboring pixels by using each of the plurality of filtering methods;

performing the intra prediction on the current block by using the filtered neighboring pixels; and selecting one of the plurality of filtering methods, based on a cost according to a result of the intra prediction.

* * * * *